US009449456B2

(12) United States Patent
Granger

(10) Patent No.: US 9,449,456 B2
(45) Date of Patent: Sep. 20, 2016

(54) AUTOMATED GAMING CHAIRS AND WAGERING GAME SYSTEMS AND MACHINES WITH AN AUTOMATED GAMING CHAIR

(75) Inventor: Toriono A. Granger, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 1144 days.

(21) Appl. No.: 13/487,425

(22) Filed: Jun. 4, 2012

(65) Prior Publication Data

US 2012/0315971 A1 Dec. 13, 2012

Related U.S. Application Data

(60) Provisional application No. 61/496,238, filed on Jun. 13, 2011, provisional application No. 61/496,257, filed on Jun. 13, 2011.

(51) Int. Cl.
*G06F 17/00* (2006.01)
*G07F 17/32* (2006.01)

(52) U.S. Cl.
CPC ...... *G07F 17/3216* (2013.01); *Y10T 29/49716* (2015.01)

(58) Field of Classification Search
None
See application file for complete search history.

(56) References Cited

U.S. PATENT DOCUMENTS

| | | | |
|---|---|---|---|
| 4,624,459 A | 11/1986 | Kaufman | |
| 4,837,728 A | 6/1989 | Barrie et al. | |
| 4,948,134 A | 8/1990 | Suttle et al. | |
| 5,022,708 A * | 6/1991 | Nordella | G09B 9/14 248/182.1 |
| 5,116,055 A | 5/1992 | Tracy | |
| 5,249,800 A | 10/1993 | Hilgendorf et al. | |
| 5,275,400 A | 1/1994 | Weingardt et al. | |
| 5,280,909 A | 1/1994 | Tracy | |
| 5,344,144 A | 9/1994 | Canon | |
| 5,377,973 A | 1/1995 | Jones et al. | |
| 5,393,057 A | 2/1995 | Marnell, II | |
| 5,524,888 A | 6/1996 | Heidel | |

(Continued)

FOREIGN PATENT DOCUMENTS

| | | |
|---|---|---|
| DE | 19624321 | 3/2002 |
| DE | 19515983 | 4/2003 |

(Continued)

OTHER PUBLICATIONS

"Big Games Safari", IGT, 24 pages (2000).

(Continued)

*Primary Examiner* — Paul A D'Agostino
(74) *Attorney, Agent, or Firm* — Nixon Peabody LLP

(57) ABSTRACT

Gaming chairs and wagering game systems and machines with a gaming chair are presented herein. A gaming chair is disclosed for a wagering game system with a controller operable to output signals associated with a wagering game. The gaming chair includes a backrest portion, a seat portion, and a base for supporting the seat and backrest portions. The base includes a height adjustment mechanism. The gaming chair also includes a motion-enabling mounting assembly that is attached to the seat portion and has at least one actuator configured to selectively move the seat portion in response to signals from the controller. The mounting assembly is movably mounted on the height adjustment mechanism of the base such that the mounting assembly, seat portion, backrest portion, and actuator(s) can be unitarily repositioned between a plurality of distinct heights.

25 Claims, 11 Drawing Sheets

(56) References Cited

U.S. PATENT DOCUMENTS 5,544,892 A 8/1996 Breeding
5,564,700 A 10/1996 Celona
5,580,063 A 12/1996 Edwards
5,580,309 A 12/1996 Piechowiak et al.
5,605,462 A * 2/1997 Denne .................... F15B 15/00 434/372
5,611,730 A 3/1997 Weiss
5,645,486 A 7/1997 Nagao et al.
5,651,548 A 7/1997 French et al.
5,655,961 A 8/1997 Acres et al.
5,678,889 A * 10/1997 Purcell, Jr. ............... A47C 1/12 297/232
5,735,742 A 4/1998 French
5,766,076 A 6/1998 Pease et al.
RE35,864 E 7/1998 Weingardt
5,779,549 A 7/1998 Walker et al.
5,816,918 A 10/1998 Kelly et al.
5,823,874 A 10/1998 Adams
5,830,063 A 11/1998 Byrne et al.
5,848,932 A 12/1998 Adams
5,855,515 A 1/1999 Pease et al.
5,876,284 A 3/1999 Acres et al.
5,885,158 A 3/1999 Torango et al.
5,889,670 A 3/1999 Schuler et al.
5,941,773 A 8/1999 Harlick
5,954,508 A * 9/1999 Lo ........................... G09B 9/02 297/257
5,975,528 A 11/1999 Halaby
6,007,427 A 12/1999 Wiener et al.
6,012,982 A 1/2000 Piechowiak et al.
6,020,875 A 2/2000 Moore et al.
6,020,876 A 2/2000 Rosenberg et al.
6,024,576 A 2/2000 Bevirt et al.
6,039,648 A 3/2000 Guinn et al.
6,047,963 A 4/2000 Pierce et al.
6,077,162 A 6/2000 Weiss
6,089,977 A 7/2000 Bennett
6,089,980 A 7/2000 Gauselmann et al.
6,102,474 A 8/2000 Daley
6,102,798 A 8/2000 Bennett et al.
6,102,799 A 8/2000 Stupak
6,104,158 A 8/2000 Jacobus et al.
6,110,041 A 8/2000 Walker et al.
6,110,043 A 8/2000 Olsen
6,139,013 A 10/2000 Pierce et al.
6,139,324 A 10/2000 Roy et al.
6,142,872 A 11/2000 Walker et al.
6,146,273 A 11/2000 Olsen
6,155,925 A 12/2000 Giobbi et al.
6,158,741 A 12/2000 Koelling
6,159,097 A 12/2000 Gura
6,168,523 B1 1/2001 Piechowiak et al.
6,203,010 B1 3/2001 Jorasch et al.
6,206,374 B1 3/2001 Jones
6,206,782 B1 3/2001 Walker et al.
6,210,164 B1 * 4/2001 Otto ......................... G09B 9/02 434/29
6,210,275 B1 4/2001 Olsen
6,210,277 B1 4/2001 Stefan
6,217,448 B1 4/2001 Olsen
6,220,593 B1 4/2001 Pierce et al.
6,224,482 B1 5/2001 Bennett et al.
6,224,484 B1 5/2001 Okuda et al.
6,231,445 B1 5/2001 Acres
6,252,579 B1 6/2001 Rosenberg et al.
6,254,483 B1 7/2001 Acres
6,256,011 B1 7/2001 Culver
6,280,328 B1 8/2001 Holch et al.
6,281,651 B1 8/2001 Haanpaa et al.
6,293,866 B1 9/2001 Walker et al.
6,300,938 B1 10/2001 Culver
6,304,091 B1 10/2001 Shahoian et al.
6,312,332 B1 11/2001 Walker et al.
6,315,660 B1 11/2001 DeMar et al.
6,319,125 B1 11/2001 Acres
6,319,127 B1 11/2001 Walker et al.
RE37,528 E 1/2002 Hannaford et al.
6,336,859 B2 1/2002 Jones et al.
6,336,862 B1 1/2002 Byrne et al.
6,345,824 B1 2/2002 Selitzky
6,358,149 B1 3/2002 Schneider et al.
6,361,441 B1 3/2002 Walker et al.
6,364,768 B1 4/2002 Acres et al.
6,375,567 B1 4/2002 Acres
6,375,568 B1 4/2002 Roffman et al.
6,416,408 B2 7/2002 Tracy et al.
6,416,409 B1 7/2002 Jordan
6,422,940 B1 7/2002 Walker et al.
6,424,333 B1 7/2002 Tremblay et al.
6,429,846 B2 8/2002 Rosenberg et al.
6,431,983 B2 8/2002 Acres
6,435,968 B1 8/2002 Torango
6,439,995 B1 8/2002 Hughs-Baird et al.
6,482,089 B2 11/2002 DeMar et al.
6,506,117 B2 1/2003 DeMar et al.
6,508,707 B2 1/2003 DeMar et al.
6,517,433 B2 2/2003 Loose et al.
6,520,855 B2 2/2003 DeMar et al.
6,545,661 B1 4/2003 Goschy et al.
6,564,168 B1 5/2003 Hasser
6,585,515 B1 7/2003 Roy et al.
6,589,115 B2 7/2003 Walker et al.
6,592,460 B2 7/2003 Torango
6,599,186 B1 7/2003 Walker et al.
6,599,188 B2 7/2003 Hirsch et al.
6,599,193 B2 7/2003 Baerlocher et al.
6,609,973 B1 8/2003 Weiss
6,623,357 B2 9/2003 Chowdhury
6,634,885 B2 * 10/2003 Hodgetts .................. G09B 9/12 434/29
6,648,753 B1 11/2003 Tracy et al.
6,648,762 B2 11/2003 Walker et al.
6,650,952 B1 11/2003 Garcia et al.
6,659,773 B2 * 12/2003 Roy ......................... A47C 3/02 434/55
6,662,560 B2 12/2003 Roy et al.
6,680,729 B1 1/2004 Shahoian et al.
6,683,437 B2 1/2004 Tierling
6,692,354 B2 2/2004 Tracy et al.
6,693,622 B1 2/2004 Shahoian et al.
6,703,550 B2 3/2004 Chu
6,704,683 B1 3/2004 Hasser
6,712,695 B2 3/2004 Mothwurf et al.
6,712,699 B2 3/2004 Walker et al.
6,733,293 B2 * 5/2004 Baker .................... G09B 19/16 434/55
6,733,390 B2 5/2004 Walker et al.
6,762,745 B1 7/2004 Braun et al.
6,781,569 B1 8/2004 Gregorio et al.
6,790,141 B2 9/2004 Muir et al.
6,802,778 B1 10/2004 Lemay et al.
6,833,846 B2 12/2004 Hasser
6,837,793 B2 1/2005 McClintic
6,864,877 B2 3/2005 Braun et al.
6,866,643 B2 3/2005 Kramer
6,887,157 B2 5/2005 LeMay et al.
6,887,159 B2 5/2005 Leen et al.
6,903,721 B2 6/2005 Braun et al.
6,904,823 B2 6/2005 Levin et al.
6,906,697 B2 6/2005 Rosenberg
6,924,787 B2 8/2005 Kramer et al.
6,932,706 B1 8/2005 Kaminkow
6,933,920 B2 8/2005 Lacroix et al.
6,937,033 B2 8/2005 Boronkay et al.
6,965,370 B2 11/2005 Gregorio et al.
6,979,164 B2 12/2005 Kramer
6,995,744 B1 2/2006 Moore et al.
7,024,625 B2 4/2006 Shalit
7,050,955 B1 5/2006 Carmel et al.
7,056,123 B2 6/2006 Gregorio et al.
7,057,613 B2 6/2006 Saikawa et al.
7,061,466 B1 6/2006 Moore et al.
7,070,571 B2 7/2006 Kramer et al.
7,096,852 B2 8/2006 Gregorio

(56) References Cited

U.S. PATENT DOCUMENTS

| | | | |
|---|---|---|---|
| 7,112,737 | B2 | 9/2006 | Ramstein |
| 7,116,317 | B2 | 10/2006 | Gregorio et al. |
| 7,148,875 | B2 | 12/2006 | Rosenberg et al. |
| 7,151,432 | B2 | 12/2006 | Tierling |
| 7,154,470 | B2 | 12/2006 | Tierling |
| 7,159,008 | B1 | 1/2007 | Wies et al. |
| 7,161,580 | B2 | 1/2007 | Bailey et al. |
| 7,166,029 | B2 | 1/2007 | Enzminger |
| 7,182,691 | B1 | 2/2007 | Schena |
| 7,196,688 | B2 | 3/2007 | Schena |
| 7,198,137 | B2 | 4/2007 | Olien |
| 7,205,981 | B2 | 4/2007 | Cunningham |
| 7,233,476 | B2 | 6/2007 | Goldenberg et al. |
| 7,245,202 | B2 | 7/2007 | Levin |
| 7,280,095 | B2 | 10/2007 | Grant |
| 7,283,120 | B2 | 10/2007 | Grant |
| RE39,906 | E | 11/2007 | Roston et al. |
| D559,328 | S | 1/2008 | Rasmussen et al. |
| 7,319,374 | B2 | 1/2008 | Shahoian |
| 7,321,799 | B2 | 1/2008 | Pillard |
| 7,331,868 | B2 | 2/2008 | Beaulieu et al. |
| 7,336,260 | B2 | 2/2008 | Martin et al. |
| 7,336,266 | B2 | 2/2008 | Hayward et al. |
| 7,367,886 | B2 | 5/2008 | Loose et al. |
| 7,369,115 | B2 | 5/2008 | Cruz-Hernandez et al. |
| 7,465,230 | B2 | 12/2008 | LeMay et al. |
| 7,479,063 | B2 | 1/2009 | Pryzby et al. |
| 7,484,172 | B2 | 1/2009 | Walker et al. |
| 7,572,186 | B2 | 8/2009 | LeMay et al. |
| 7,722,453 | B2 | 5/2010 | Lark et al. |
| 7,753,789 | B2 | 7/2010 | Walker et al. |
| 7,766,747 | B2 | 8/2010 | Bonney et al. |
| 7,803,053 | B2 | 9/2010 | Atkinson |
| 7,883,413 | B2 | 2/2011 | Paulsen |
| 7,918,738 | B2 | 4/2011 | Paulsen |
| 7,934,773 | B2 * | 5/2011 | Boulais .................. A47C 7/002 297/217.3 |
| 8,029,369 | B2 | 10/2011 | Hahn |
| 8,113,517 | B2 | 2/2012 | Canterbury et al. |
| 8,608,475 | B2 * | 12/2013 | Roy ......................... G09B 9/08 434/29 |
| 8,678,936 | B2 * | 3/2014 | Lesley .................... G07F 17/32 273/148 B |
| 8,747,225 | B2 * | 6/2014 | Canterbury ............. G07F 17/32 273/148 B |
| 8,864,593 | B2 * | 10/2014 | Gil ........................... A47C 1/12 434/55 |
| 9,078,523 | B2 * | 7/2015 | Menard .................... A47C 1/12 |
| 2001/0005815 | A1 | 6/2001 | Rosenberg et al. |
| 2001/0026266 | A1 | 10/2001 | Schena et al. |
| 2002/0138594 | A1 | 9/2002 | Rowe |
| 2002/0151345 | A1 | 10/2002 | Byrne |
| 2002/0155874 | A1 | 10/2002 | Byrne |
| 2003/0018403 | A1 | 1/2003 | Braun et al. |
| 2003/0025723 | A1 | 2/2003 | Olien et al. |
| 2003/0027618 | A1 | 2/2003 | Byrne |
| 2003/0036430 | A1 | 2/2003 | Cannon |
| 2003/0038776 | A1 | 2/2003 | Rosenberg et al. |
| 2003/0045337 | A1 | 3/2003 | Byrne |
| 2003/0045354 | A1 | 3/2003 | Giobbi |
| 2003/0047874 | A1 | 3/2003 | Leen et al. |
| 2003/0050106 | A1 | 3/2003 | Lyfoung |
| 2003/0064776 | A1 | 4/2003 | Byrne |
| 2003/0064807 | A1 | 4/2003 | Walker et al. |
| 2003/0068053 | A1 | 4/2003 | Chu |
| 2003/0076298 | A1 | 4/2003 | Rosenberg |
| 2003/0114218 | A1 | 6/2003 | McClintic |
| 2003/0119576 | A1 | 6/2003 | McClintic et al. |
| 2003/0148808 | A1 | 8/2003 | Price |
| 2003/0181231 | A1 | 9/2003 | Vancura et al. |
| 2003/0186733 | A1 | 10/2003 | Wolf et al. |
| 2003/0216166 | A1 | 11/2003 | Baerlocher et al. |
| 2003/0222402 | A1 | 12/2003 | Olive |
| 2003/0224852 | A1 | 12/2003 | Walker |
| 2003/0228899 | A1 | 12/2003 | Evans |
| 2003/0236116 | A1 | 12/2003 | Marks et al. |
| 2004/0009808 | A1 | 1/2004 | Gauselmann |
| 2004/0009811 | A1 | 1/2004 | Torango |
| 2004/0038741 | A1 | 2/2004 | Gauselmann |
| 2004/0048644 | A1 | 3/2004 | Gerrard et al. |
| 2004/0087368 | A1 | 5/2004 | Gauselmann |
| 2004/0106448 | A1 | 6/2004 | Gauselmann |
| 2004/0132524 | A1 | 7/2004 | Ramstad et al. |
| 2004/0166930 | A1 | 8/2004 | Beaulieu et al. |
| 2004/0166937 | A1 | 8/2004 | Rothschild et al. |
| 2004/0204226 | A1 | 10/2004 | Foster et al. |
| 2004/0204235 | A1 | 10/2004 | Walker et al. |
| 2004/0229192 | A1 | 11/2004 | Roy et al. |
| 2004/0235552 | A1 | 11/2004 | Gauselmann |
| 2004/0242297 | A1 | 12/2004 | Walker et al. |
| 2004/0242303 | A1 | 12/2004 | Walker et al. |
| 2004/0254020 | A1 * | 12/2004 | Dragusin ................ A63F 13/08 463/46 |
| 2005/0014554 | A1 | 1/2005 | Walker et al. |
| 2005/0026674 | A1 | 2/2005 | Wolf et al. |
| 2005/0032568 | A1 | 2/2005 | Griswold et al. |
| 2005/0140088 | A1 | 6/2005 | Randall |
| 2005/0148382 | A1 | 7/2005 | Fox |
| 2005/0187008 | A1 | 8/2005 | Nakajima |
| 2005/0192073 | A1 | 9/2005 | Nakajima |
| 2005/0192091 | A1 | 9/2005 | Siewert et al. |
| 2005/0197181 | A1 | 9/2005 | Jaffe |
| 2005/0248549 | A1 | 11/2005 | Dietz et al. |
| 2005/0282603 | A1 | 12/2005 | Parrott et al. |
| 2005/0282628 | A1 | 12/2005 | Beatty et al. |
| 2006/0012118 | A1 | 1/2006 | Mamitsu et al. |
| 2006/0014580 | A1 | 1/2006 | Hawthorn |
| 2006/0022952 | A1 | 2/2006 | Ryynanen |
| 2006/0033662 | A1 | 2/2006 | Ward et al. |
| 2006/0040739 | A1 | 2/2006 | Wells |
| 2006/0058100 | A1 | 3/2006 | Pacey et al. |
| 2006/0066569 | A1 | 3/2006 | Eid et al. |
| 2006/0109256 | A1 | 5/2006 | Grant et al. |
| 2006/0119586 | A1 | 6/2006 | Grant et al. |
| 2006/0119589 | A1 | 6/2006 | Rosenberg et al. |
| 2006/0135248 | A1 | 6/2006 | Anderson et al. |
| 2006/0157632 | A1 | 7/2006 | Delson |
| 2006/0187215 | A1 | 8/2006 | Rosenberg et al. |
| 2006/0192771 | A1 | 8/2006 | Rosenberg et al. |
| 2006/0256075 | A1 | 11/2006 | Anastas et al. |
| 2006/0256234 | A1 | 11/2006 | Roy et al. |
| 2006/0256972 | A1 | 11/2006 | Roy et al. |
| 2006/0281530 | A1 | 12/2006 | Seelig et al. |
| 2006/0290662 | A1 | 12/2006 | Houston et al. |
| 2007/0004510 | A1 | 1/2007 | Underdahl et al. |
| 2007/0013677 | A1 | 1/2007 | Rosenberg et al. |
| 2007/0040815 | A1 | 2/2007 | Rosenberg et al. |
| 2007/0057913 | A1 | 3/2007 | Eid et al. |
| 2007/0066393 | A1 | 3/2007 | Paul et al. |
| 2007/0122793 | A1 | 5/2007 | Orban et al. |
| 2007/0149281 | A1 | 6/2007 | Gadda et al. |
| 2007/0182711 | A1 | 8/2007 | Grant et al. |
| 2007/0232348 | A1 | 10/2007 | Tierling et al. |
| 2007/0236449 | A1 | 10/2007 | Lacroix et al. |
| 2007/0236474 | A1 | 10/2007 | Ramstein |
| 2007/0242040 | A1 | 10/2007 | Ullrich et al. |
| 2007/0259716 | A1 | 11/2007 | Mattice et al. |
| 2007/0259717 | A1 | 11/2007 | Mattice et al. |
| 2007/0270216 | A1 | 11/2007 | Pryzby |
| 2007/0279401 | A1 | 12/2007 | Ramstein et al. |
| 2008/0024440 | A1 | 1/2008 | Olien et al. |
| 2008/0039215 | A1 | 2/2008 | Hahn |
| 2008/0045331 | A1 | 2/2008 | LeMay et al. |
| 2008/0054561 | A1 | 3/2008 | Canterbury et al. |
| 2008/0055244 | A1 | 3/2008 | Cruz-Hernandez et al. |
| 2008/0064499 | A1 | 3/2008 | Grant et al. |
| 2008/0068334 | A1 | 3/2008 | Olien et al. |
| 2008/0084384 | A1 | 4/2008 | Gregorio et al. |
| 2008/0100584 | A1 | 5/2008 | Hague et al. |
| 2008/0109265 | A1 | 5/2008 | Roy et al. |
| 2008/0211276 | A1 | 9/2008 | Rasmussen |
| 2008/0246321 | A1 | 10/2008 | Canterbury |
| 2009/0062001 | A1 | 3/2009 | LeMay et al. |
| 2010/0090507 | A1 * | 4/2010 | Boulais .................. A47C 7/002 |

(56) References Cited

U.S. PATENT DOCUMENTS

| | | | | |
|---|---|---|---|---|
| | | | | 297/217.3 |
| 2010/0234094 | A1 | 9/2010 | Gagner et al. | |
| 2010/0291993 | A1 | 11/2010 | Gagner et al. | |
| 2011/0003631 | A1 * | 1/2011 | Tastad | A47C 7/72 463/25 |
| 2011/0111839 | A1 | 5/2011 | Lesley et al. | |
| 2011/0111847 | A1 | 5/2011 | Lesley et al. | |
| 2012/0019030 | A1 * | 1/2012 | Menard | A47C 1/12 297/217.3 |
| 2012/0108321 | A1 * | 5/2012 | Radek | G07F 17/3216 463/25 |
| 2012/0108333 | A1 * | 5/2012 | Radek | G07F 17/3216 463/36 |
| 2012/0115589 | A1 | 5/2012 | Canterbury et al. | |
| 2012/0220363 | A1 * | 8/2012 | Bytnar | G07F 17/3213 463/25 |
| 2012/0282997 | A1 * | 11/2012 | Miner | G07F 17/3216 463/25 |
| 2012/0302302 | A1 * | 11/2012 | Hamlin | G07F 17/3202 463/7 |
| 2012/0302323 | A1 * | 11/2012 | Gagner | G07F 17/3202 463/25 |
| 2012/0315971 | A1 * | 12/2012 | Granger | G07F 17/3216 463/16 |
| 2012/0315985 | A1 * | 12/2012 | Granger | G07F 17/3216 463/31 |

FOREIGN PATENT DOCUMENTS

| | | | |
|---|---|---|---|
| EP | 0521599 | | 1/1993 |
| GB | 2153572 | | 8/1985 |
| GB | 2181589 | | 4/1987 |
| GB | 2242300 | | 9/1991 |
| GB | 2313792 | | 12/1997 |
| GB | 2333880 | | 8/1999 |
| JP | 3026107 U | † | 7/1996 |
| WO | WO 99/03078 | | 1/1999 |
| WO | WO 9919037 | | 4/1999 |
| WO | WO 99/56087 | | 11/1999 |
| WO | WO 0133478 | | 5/2001 |
| WO | WO 02/078810 | | 10/2002 |
| WO | WO 03/012557 | | 2/2003 |
| WO | WO 03/026754 | | 4/2003 |
| WO | WO 03/032289 | | 4/2003 |
| WO | WO 03/051062 | | 6/2003 |
| WO | WO 03/083789 | | 10/2003 |
| WO | WO 2004/036405 | | 4/2004 |
| WO | WO 2004/038573 | | 5/2004 |
| WO | WO 2004/109488 | | 12/2004 |
| WO | WO 2004/111818 | | 12/2004 |
| WO | WO 2004/111819 | | 12/2004 |
| WO | WO 2005/057546 | | 6/2005 |
| WO | WO 2005/065113 | | 7/2005 |
| WO | WO 2005/065147 | | 7/2005 |
| WO | WO 2005/117648 | | 12/2005 |
| WO | WO 2005/117649 | | 12/2005 |
| WO | WO 2006/017254 | | 2/2006 |
| WO | WO 2006/019389 | | 2/2006 |
| WO | WO 2006/036458 | | 4/2006 |
| WO | WO 2006/071449 | | 7/2006 |
| WO | WO 2007/003928 | | 1/2007 |
| WO | WO 2007/043036 | | 4/2007 |
| WO | WO 2007/047960 | | 4/2007 |
| WO | WO 2007/059172 | | 5/2007 |
| WO | WO 2007/143849 | | 12/2007 |
| WO | WO 2008/042745 | | 4/2008 |
| WO | WO 2008/048831 | | 4/2008 |
| WO | WO 2008/049217 | | 5/2008 |
| WO | WO 2011/060331 | | 11/2010 |

OTHER PUBLICATIONS

"Easy Riches" by Sigma Game, Strictly Slots, 1 page (Aug. 2001).
"Millioniser" by Glenn Haussman, Strictly Slots, pp. 50-53 (Mar. 2004).
"New '97 Games", International Gaming & Wagering Business, 24 pages (Mar. 1997).
Gesture Central—Use Your Head Specs and Tech, http://www.gesturecentral.com/useyourhead/specs.html, (downloaded 2007); (4 pages).
International Search Report corresponding to co-pending International Patent Application Serial No. PCT/US2008/005910, European Patent Office; dated Sep. 5, 2008; 2 pages.
International Search Report corresponding to co-pending International Patent Application Serial No. PCT/US2008/082990, United States Patent Office; dated Jan. 27, 2009; 3 pages.
International Search Report, PCT/US2006/034830, 3pages, dated Jul. 9, 2007.
Money: Eon Technology puts holograms at hand—OCRegister.com; http://www.ocregister.com/ocregister/money/abox/article_1287471.php; (downloaded 2007); (7 pages).
PrimeSense, http://primesense.com/markets.html, (downloaded 2007); (2 pages).
See, hear and feel the game with amBX; Philips amBX for SGC5103BD brochure; dated Jul. 17, 2007; (2 pages).
Written Opinion corresponding to co-pending International Patent Application Serial No. PCT/US2008/005910, European Patent Office; dated Sep. 5, 2008; 7 pages.
Written Opinion corresponding to co-pending International Patent Application Serial No. PCT/US2008/082990, United States Patent Office; dated Jan. 27, 2009; 9 pages.

* cited by examiner
† cited by third party

FIG. 6B
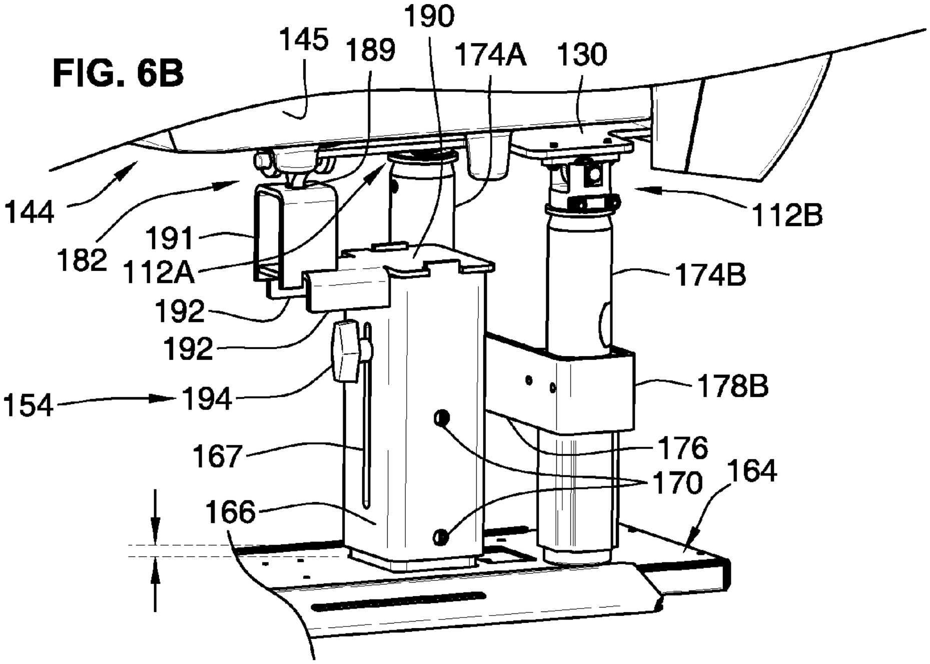
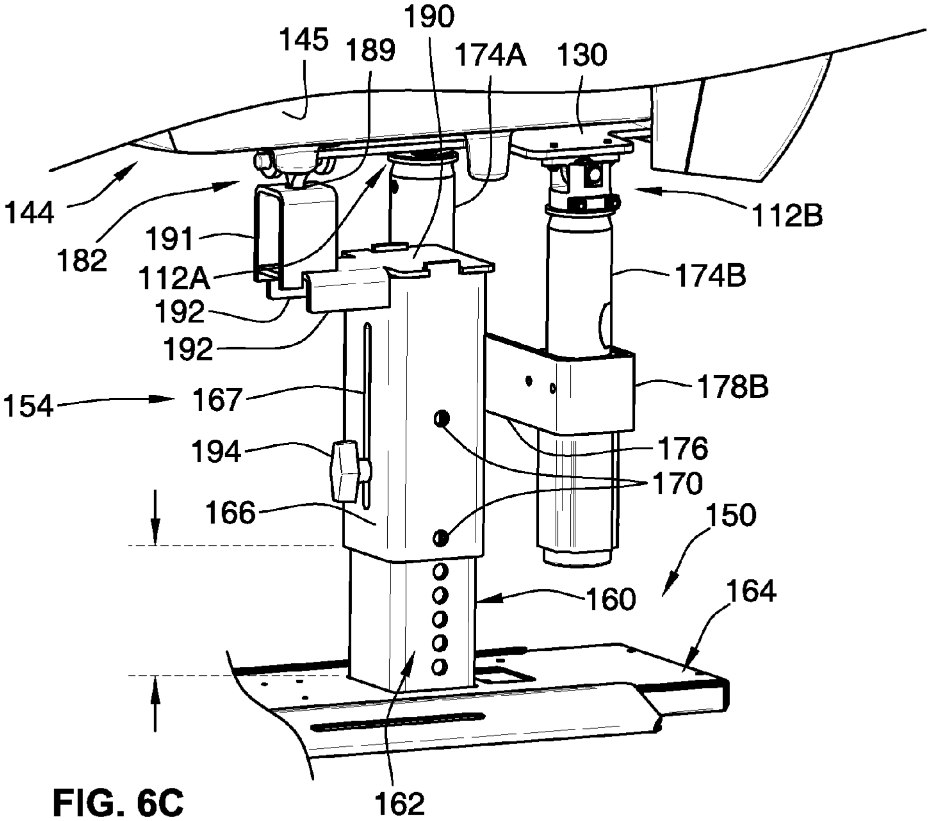
FIG. 6C

AUTOMATED GAMING CHAIRS AND WAGERING GAME SYSTEMS AND MACHINES WITH AN AUTOMATED GAMING CHAIR

CROSS-REFERENCE AND CLAIM OF PRIORITY TO RELATED APPLICATIONS

This application claims the benefit of and priority to U.S. Provisional Patent Application No. 61/496,238, which was filed on Jun. 13, 2011, and U.S. Provisional Patent Application No. 61/496,257, which was filed on Jun. 13, 2011, both of which are incorporated herein by reference in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present disclosure relates generally to wagering game machines and systems, and more particularly to automated gaming chairs, as well as wagering game machines and wagering game systems with one or more automated gaming chairs.

BACKGROUND

Gaming machines, such as slot machines, video poker machines, and the like, have been a cornerstone of the gaming industry for several years. Generally, the popularity of such machines with players is dependent on the likelihood (or perceived likelihood) of winning money at the machine, as well as the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Consequently, shrewd operators strive to employ the most entertaining and exciting machines, features, and enhancements available because such machines attract frequent play, enhance player loyalty and, hence, increase profitability to the operator.

Heretofore, gaming machine design and innovation has focused primarily on attraction devices, lighting, payout mechanisms, networking, and predominantly on game play, such as base game characteristics and enhancements, bonus games, progressive-type game play, and community gaming. Gaming chairs have received less attention, with such attention being generally limited to improving player comfort and convenience. Even less attention has been paid to automating chair positioning, integrating haptic technology, and improving other game-dependent chair features.

While player comfort has been addressed to some extent, typically, it has been isolated to chair ergonomics and the incorporation of adjustable features, such as pivotable arm rests, stowable cup holders, etc. For instance, players typically cannot sit back in the gaming chair and relax in comfort because the game play buttons are located on the gaming machine, which requires most players to lean forward. Materials used to promote comfort for individuals maintaining a prone, seated position for extended periods of time have been incorporated to alleviate discomfort and create an environment that enhances the gaming experience.

Convenience features also enhance the enjoyment realized by gaming patrons. For example, footrests, adjustable headrests, and adjustable-height seat cushions allow for players of different sizes and preferences to use and enjoy the same gaming chair. In addition, chair-mounted gaming buttons eliminate the need for players to reach for standard input devices on the cabinet, making the player's gaming experience more comfortable and convenient, and thus more enjoyable.

As the complexity and capacity of microcomputer programs continue to grow, the graphics and audio of wagering games have become more realistic and intense. As a result, different accessories have been provided to enhance the players audio and visual experiences. Surround-sound speaker systems and high-definition wide-screen displays are just some of the accessories that are available on modern gaming machines, often times being integrated into the gaming chair, to enhance the graphic and acoustic output of wagering games and, thus, increase player enjoyment.

Another recent enhancement for wagering game chairs is automation of the seat of the gaming chair. Historically, gaming chair seats were mechanized to provide adjustable heights and positioning to afford improved player comfort. More recently, however, gaming chair seats have been modified to vibrate or shift during game play to simulate events that occur in the wagering game. On a much more limited scale, some gaming chairs have been designed with specialized hardware, such as fans, heating elements, and haptic actuators, for creating game-related tactile sensations. Additional improvements to gaming chair features can add to the value and excitement of the gaming environment.

Automated gaming chairs that are presently available in the wagering game industry have a number of identifiable limitations. As an initial matter, current fully-automated gaming chair designs with moving seats, backrests, footrests, etc., are very expensive to manufacture and maintain due to the requisite mechanical and electrical "automating" hardware. Another known drawback is that "full-motion" gaming chairs with moving seats and backrests can cause anxiety and discomfort for some players, especially the handicapped and the elderly. In addition, most gaming chairs are either automated motion-type gaming chairs or standard non-motion gaming chairs, generally lacking the ability to switch between the two types. Current chair designs are not provided with the requisite hardware to address these issues. There is therefore a need for gaming chair designs that address the foregoing limitations.

SUMMARY

According to aspects of the present disclosure, a gaming system for playing a wagering game is presented. The gaming system includes a display device configured to display an outcome of the wagering game, which is randomly determined from a plurality of wagering game outcomes, and a controller configured to output signals related to the wagering game. The gaming system also includes a gaming chair with a seat assembly, a base configured to support the seat assembly, and a height adjustment mechanism between the base and the seat assembly. A motion-enabling mounting assembly is attached to the gaming chair. The motion-enabling mounting assembly has at least one actuator that is configured to selectively move the seat assembly in response to signals from the controller. The mounting assembly is movably mounted to the height adjustment mechanism such that the mounting assembly, seat assembly and at least one actuator reposition in unison between a plurality of distinct heights.

According to other aspects of the present disclosure, a gaming system is provided for playing a wagering game. In this embodiment, the gaming system includes a controller, an input device for receiving a wager from a player to play the wagering game, and a display device for displaying an outcome of the wagering game, which is determined from a plurality of wagering game outcomes. The gaming system also includes a gaming chair with a seat portion, a base, a mounting assembly, and a height adjustment mechanism between the seat portion and the base. The mounting assembly includes a multi-directional connector and at least one actuator that cooperatively couple the mounting assembly to the seat portion. The at least one actuator is configured to selectively move the seat portion in response to signals from the controller. The mounting assembly movably mounts the seat portion to the height adjustment mechanism such that the mounting assembly, the seat portion and the at least one actuator reposition unitarily between a plurality of distinct heights.

According to additional aspects of the present disclosure, a gaming chair is presented for a wagering game system, such as a gaming machine, a networked gaming terminal, or a handheld gaming device. The gaming chair includes a backrest portion, a seat portion, and a base configured to support the seat portion and the backrest portion. The base includes a height adjustment mechanism. A motion-enabling mounting assembly is attached to the seat portion. The mounting assembly has one or more actuators for selectively moving the seat portion in response to signals from a game-system controller. The mounting assembly is movably mounted on the height adjustment mechanism of the base such that the mounting assembly, seat portion, backrest portion, and at least one actuator unitarily reposition between a plurality of distinct heights.

Aspects of the present disclosure are also directed to a motion-enabling mounting assembly for a gaming chair with a seat assembly and a base assembly. The base assembly includes a support column that projects from a support platform. The motion enabling mounting assembly includes first and second actuators that are configured to attach to the seat assembly. Each of the actuators is selectively actuatable to apply rectilinear forces to the seat assembly. A multi-directional connector is also configured to attach to the seat assembly. The multi-directional connector has at least two-degrees of rotational freedom. The actuators and multi-directional connector are attached to a tubular mounting shaft, which is configured to attach to the gaming chair via the actuators and the multi-directional connector. The tubular mounting shaft is also configured to telescope with and connect to the support column of the base to thereby lock the gaming chair at any one of a plurality of heights.

Also presented herein are methods of mounting a gaming chair for a wagering game system. The gaming chair has a seat portion and a base assembly, which includes a support column that projects from a support platform. The method includes: connecting a motion-enabled mounting assembly to the seat portion of the gaming chair, the mounting assembly including a tubular mounting shaft attached to at least one actuator, which is configured to selectively move the seat portion in response to signals from a controller; telescoping the mounting shaft onto the support column; translating the mounting shaft with respect to the support column to thereby unitarily reposition both the gaming chair and the mounting assembly to a desired height; and fastening the mounting shaft to the support column to thereby secure both the gaming chair and the mounting assembly at the desired height.

The above summary is not intended to represent each embodiment, or every aspect, of the present disclosure. The above features and advantages, and other features and advantages of the present disclosure, will be readily apparent from the following detailed description of the illustrated embodiments and exemplary modes for carrying out the invention when taken in connection with the accompanying drawings and appended claims.

BRIEF DESCRIPTION OF THE DRAWINGS

FIG. 6B is an alternative enlarged perspective-view illustration of the exemplary gaming chair of FIG. 6 shown in a first ("vertically lowest") position.

FIG. 6C is another enlarged perspective-view illustration of the exemplary gaming chair of FIG. 6 shown in a second ("vertically highest") position.

Figure 1:
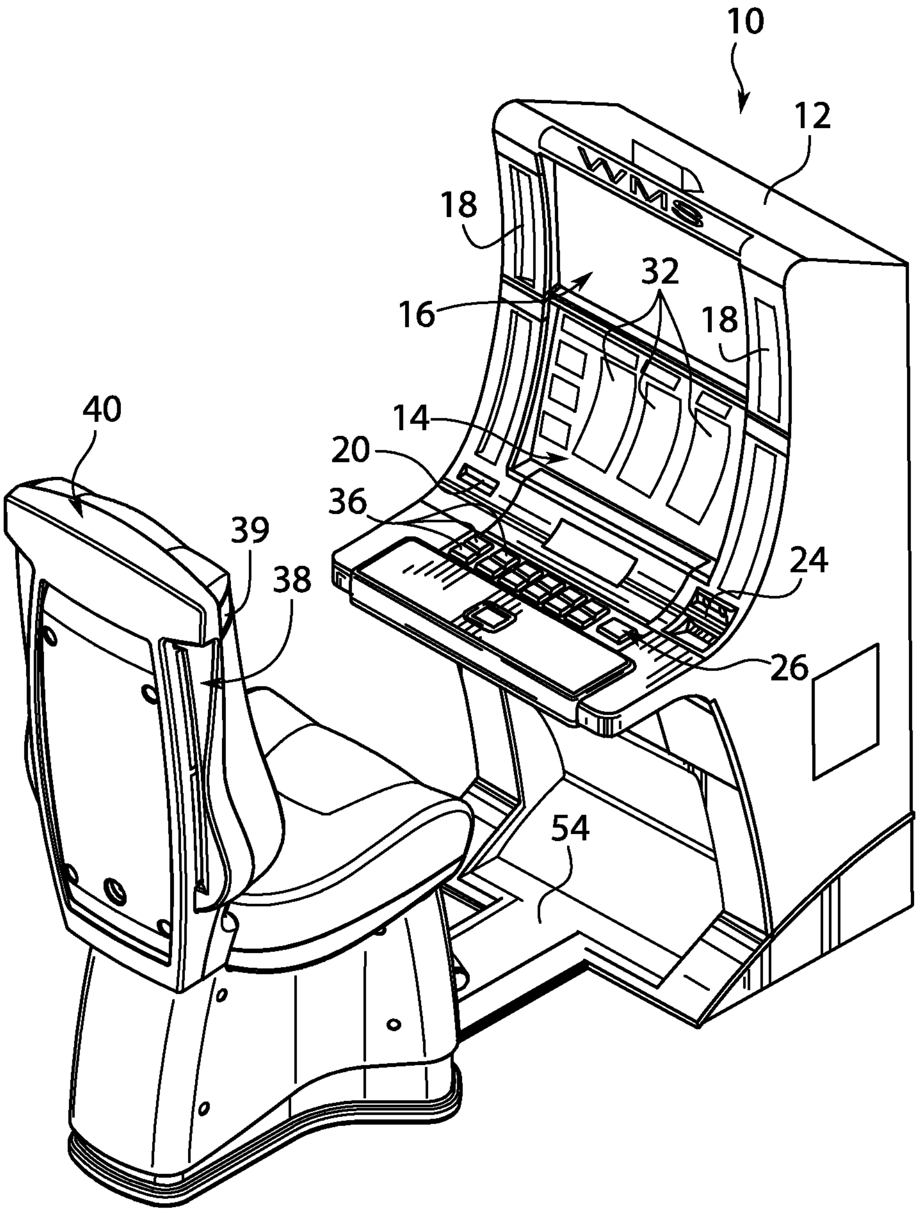
FIG. 1 is a perspective-view illustration of an exemplary gaming machine with a gaming chair in accordance with aspects of the present disclosure.

While the invention is susceptible to various modifications and alternative forms, specific embodiments have been shown by way of example in the drawings and will be described in detail herein. It should be understood, however, that this disclosure is not intended to be limited to the particular forms disclosed. Rather, the disclosure is to cover all modifications, equivalents, and alternatives falling within the spirit and scope of the invention as defined by the appended claims.

DETAILED DESCRIPTION OF THE EXEMPLARY EMBODIMENTS

While this invention is susceptible of embodiment in many different forms, there are shown in the drawings and will herein be described in detail representative embodiments of the disclosure with the understanding that the present disclosure is to be considered as an exemplification of the principles of the invention and is not intended to limit the broad aspect of the invention to the embodiments illustrated. To that extent, elements and limitations that are disclosed herein, for example, in the Abstract, Summary, and Detailed Description of the Embodiments sections, but not explicitly set forth in the claims, should not be incorporated into the claims, singly or collectively, by implication, inference or otherwise. For purposes of the present detailed description, unless specifically disclaimed, the singular includes the plural and vice versa; the words "and" and "or" shall be both conjunctive and disjunctive; the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring to FIG. 1, a perspective-view illustration of an exemplary gaming terminal 10 (also referred to herein as "wagering game machine" or "gaming machine") is shown in accordance with one embodiment of the present disclosure. The gaming terminal 10 of FIG. 1 may be used, for example, in traditional gaming establishments, such as casinos, and non-traditional gaming establishments, such as pools, hotels, restaurants, and airports. With regard to the present disclosure, the gaming terminal 10 may be any type of gaming terminal and may have varying structures and methods of operation. For instance, the gaming terminal 10 may be an electromechanical gaming terminal configured, for example, to play mechanical slots, or it may be an electronic gaming terminal configured, for example, to play a video casino game, such as slots, keno, poker, blackjack, roulette, craps, etc. It should be understood that although the gaming terminal 10 is shown as a free-standing gaming terminal of the upright type, the gaming machines of the present disclosure may take on a wide variety of other forms, such as free-standing gaming terminals of the slant-top type, "countertop" gaming devices, hand-held or portable gaming devices, etc. Finally, the drawings presented herein are not to scale and are provided purely for instructional purposes; as such, the individual and relative dimensions shown in the drawings are not to be considered limiting.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor (not shown), one or more information readers 24, one or more player-input devices 26, and one or more player-accessible ports 28 (e.g., an audio output jack for headphones, a video headset jack, a wireless transmitter/receiver, etc., shown in FIG. 2). While these typical components found in the gaming terminal 10 are described below, it should be understood that numerous additional/alternative peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in commonly owned U.S. Pat. No. 6,517,433, to Loose et al., entitled "Reel Spinning Slot Machine with Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10.

Figure 3:
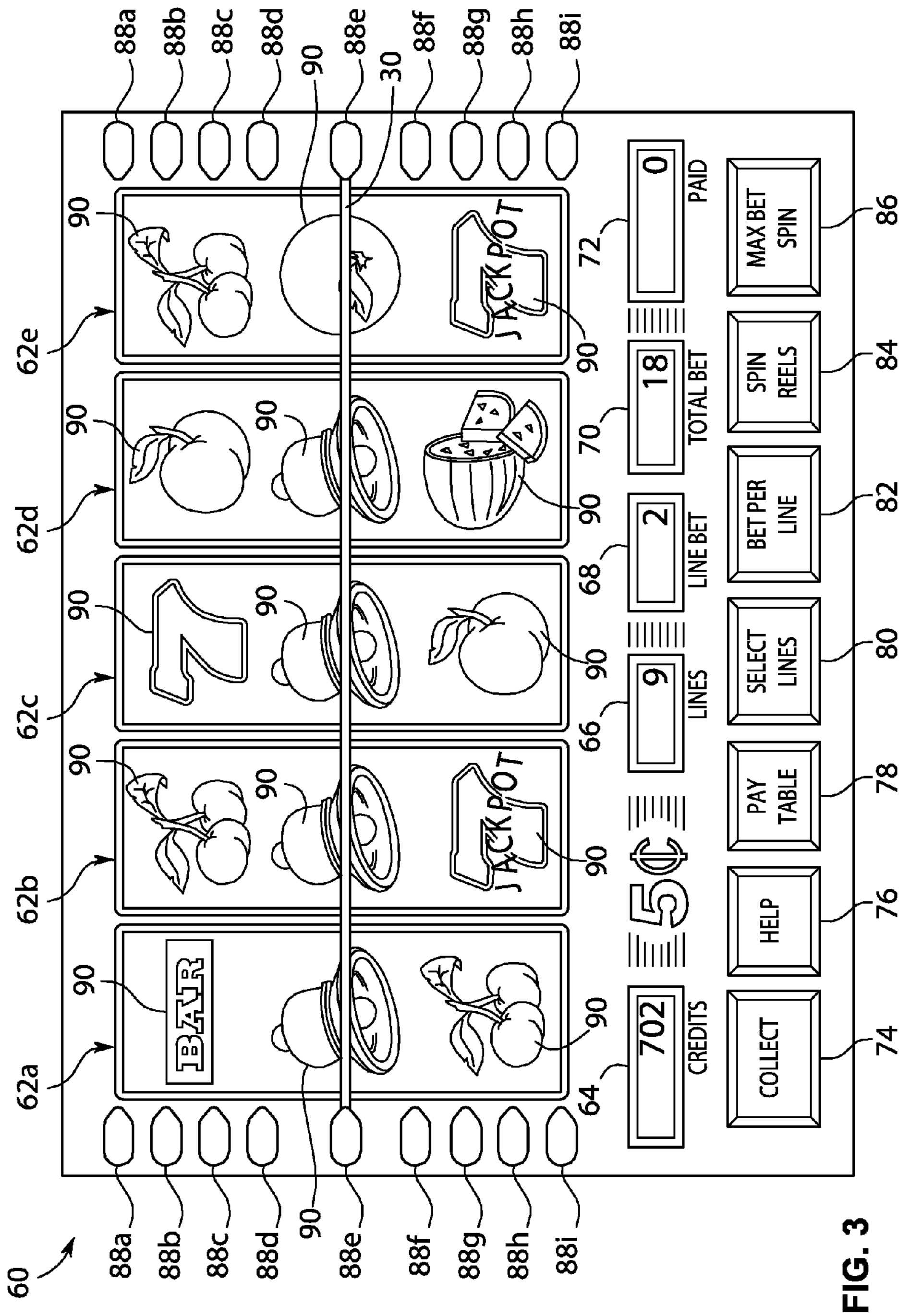
FIG. 3 is a screen shot of a basic-game screen of an exemplary wagering game that can be played on the gaming machine of FIG. 1 and/or the gaming system of FIG. 2.

As seen, for example, in FIG. 3, the primary display area 14 may include one or more paylines 30 extending along a portion thereof. In some embodiments, the primary display area 14 comprises a plurality of mechanical reels (shown with hidden lines at 32) and a video display 34 such as a transmissive display (or a reflected image arrangement in other embodiments) in front of the mechanical reels 32. If the wagering game conducted via the gaming terminal 10 relies upon the video display 34 only, and not the mechanical reels 32, the mechanical reels 32 may be removed from the interior of the terminal 10 and the video display 34 may be of a non-transmissive type (featured below in a representative embodiment in FIG. 3). In contrast, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include, for example, a plurality of buttons 36 on a button panel. In addition, or as an alternative thereto, a touch screen may be mounted over the primary display area 14 and/or the secondary display area 16 and having one or more soft touch keys, as exemplified in FIG. 3. The player-input devices 26 may further comprise technologies that do not rely upon touching the gaming terminal, such as speech-recognition technology, movement- and gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed, for example, in U.S. Patent Application Publication No. 2003/0045354, entitled "Portable Data Unit for Communicating with Gaming Machine Over Wireless Link," which is incorporated herein by reference in its entirety. The account may be stored directly on the portable medium, or at an external system 46 (see FIG. 2) as more fully disclosed, for example, in U.S. Pat. No. 6,280,328, to Holch et al., entitled "Cashless Computerized Video Game System and Method," which is incorporated herein by referenced in its entirety. To enhance security, the individual carrying the portable medium may be required to enter a secondary independent authenticator (e.g., password, PIN number, biometric, etc.) to access their account.

FIG. 1 depicts the gaming machine 10 with an attached automated gaming chair 40. This representative gaming chair 40 is located in operational proximity of the gaming machine 10. For instance, in the illustrated embodiment of FIG. 1, the gaming chair 40 is mounted to the gaming floor, facing the gaming machine 10—i.e., immediately adjacent and in opposing relation to the gaming machine 10. The gaming chair 40 is operable to receive and process signals from the gaming machine 10. In this example, the gaming chair 40 is electrically and mechanically coupled to the gaming machine 10 via a sled 54. Alternatively, the gaming chair 40 may be detachably coupled to the gaming floor and/or gaming machine 10 or may lack any physical connection with the gaming floor and/or gaming machine 10. As additional design options, the gaming chair 40 may be operatively coupled to the gaming machine 10 via alternative means, such as a wireless interface (e.g., infrared, radio, laser, or other wireless communication technologies) or other hard line connections (e.g., fiber optic cabling). Also, as described below, the gaming chair 40 may be automated to provide, for example, simulated motions related to events occurring during game play or associated with events unrelated to game play.

Figure 2:
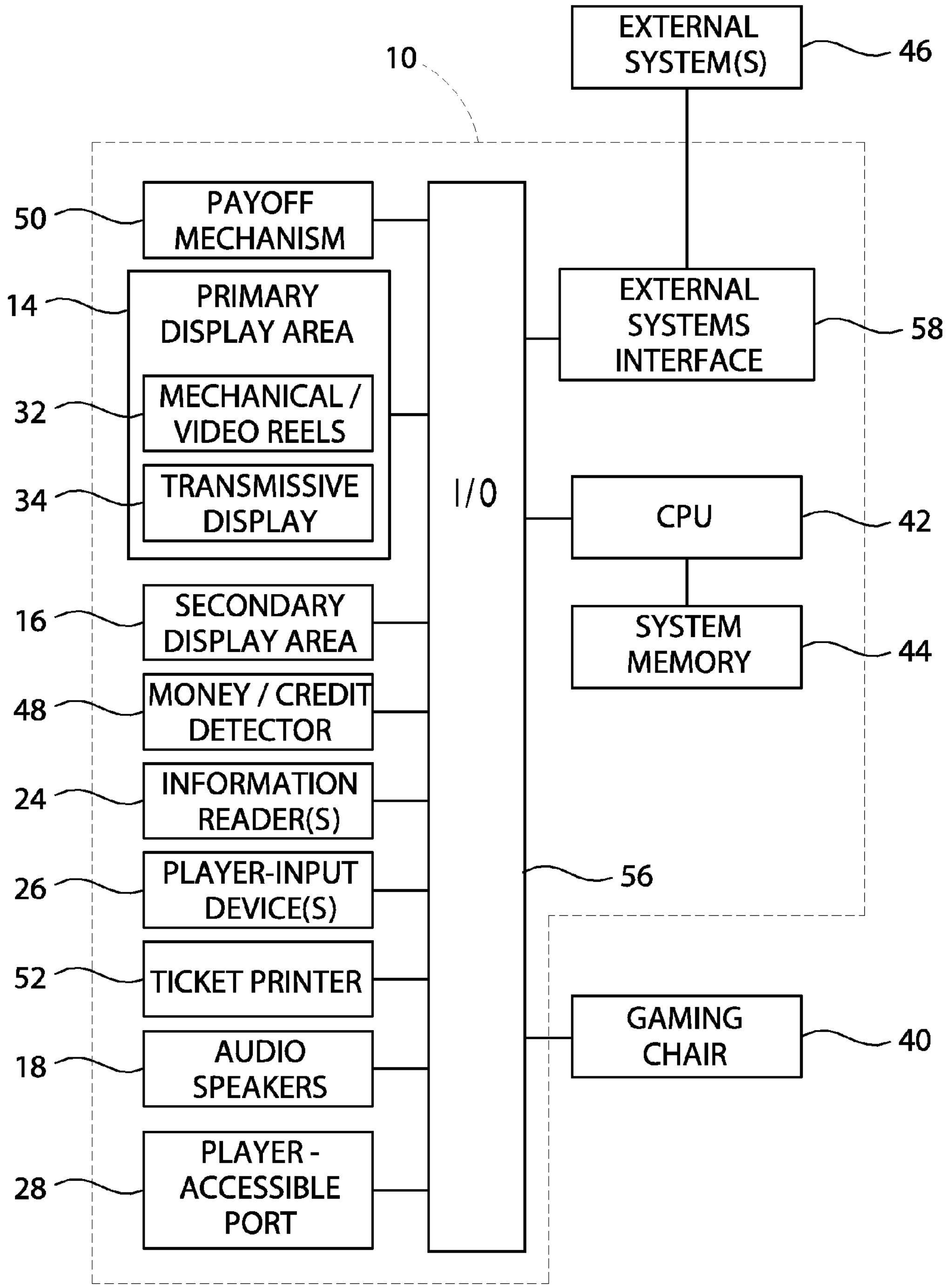
FIG. 2 is a schematic diagram of an exemplary gaming system with a gaming chair in accordance with aspects of the present disclosure.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device(s). The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and/or multiple program memories. The money/credit detector 48 signals the processor 42 that money and/or credits have been input via a value-input device, such as the bill validator 20 or coin acceptor 22 of FIG. 1, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, the gaming chair 40, and a payoff mechanism 50. The payoff mechanism 50 is operable, for example, in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

In some embodiments, the controller 42 is also connected to, and controls, the gaming chair 40. For example, the controller 42 can regulate the actuation and modulation of one or motion actuators operatively attached to or packaged inside, on, or near the gaming chair 40. Moreover, the controller 42 may be designed to regulate an emotive lighting assembly 38 packaged in the backrest assembly of the gaming chair 40 to create a preferred gaming ambiance and/or a predetermined gaming experience. To this regard, the audio output of a speaker package 39 mounted, for example, in the backrest portion of the gaming chair 40 may also be controlled by the controller 42. A number of optional audio and lighting features that may be incorporated into the gaming chair 40 (or any of the other embodiments disclosed herein) are disclosed in commonly owned U.S. patent application Ser. No. 12/944,880 (Pre-grant Patent Publication No. US 2011/0111847 A1), to Paul M. Lesley et al., which was filed on Nov. 12, 2010, and is incorporated herein by reference in its entirety. Additional information regarding speaker systems for gaming devices and gaming chairs is disclosed in commonly-assigned U.S. Patent Application Publication No. 2008/0211276 A1, to James M. Rasmussen, filed on Dec. 19, 2007, which is also incorporated herein by reference in its entirety.

Communications between the controller 42 and both the peripheral components of the gaming terminal 10 and the external system 46 occur through input/output (I/O) circuit 56, which can include any suitable bus technologies, such as an AGTL+ front side bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 may be connected to an external system interface 58, which is connected to the external system 46. In this exemplary configuration, the controller 42 communicates with the external system 46 via the external system interface 58 and a communication path (e.g., serial, parallel, IR, RC, 10 bT, etc.). The external system 46 may include a gaming network, other gaming terminals, a gaming server, a remote controller, communications hardware, or a variety of other interfaced systems or components.

The controller 42 of FIG. 2 comprises any combination of hardware, software, and/or firmware now known or hereinafter developed that may be disposed or reside inside and/or outside of the gaming terminal 10, and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Security features may be advantageously utilized where the gaming machine 10 communicate wirelessly with external systems 46, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, ESTABLISHING WIRELESS ROBUST SECURITY NETWORKS: A GUIDE TO IEEE 802.11, and SP 800-48, WIRELESS NETWORK SECURITY: 802.11, BLUETOOTH AND HANDHELD DEVICES, both of which are incorporated herein by reference in their respective entireties.

Referring now to FIG. 3, an image of a basic-game screen 60 adapted to be displayed on the primary display area 14 of FIG. 1 is illustrated, according to one embodiment of the present disclosure. A player begins play of a basic wagering game by providing a wager (e.g., inserting a cash note or substitute currency media into the validator 20, and/or inserting a player-card into information reader 24). A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present disclosure does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation, animation, or other indicia, and may further include a "blank" symbol.

Symbol combinations may be evaluated as line pays or "scatter pays". Line pays may be evaluated left to right, right to left, top to bottom, bottom to top, or any combination thereof by evaluating the number, type, or order of symbols 90 appearing along an activated payline 30. Scatter pays, on the other hand, are evaluated without regard to position or paylines, and only require that such combination appears anywhere on the reels 62*a-e*. While an embodiment with nine paylines is shown, a wagering game with no paylines, a single payline, or any plurality of paylines will also work with the present disclosure. Additionally, though an embodiment with five reels is shown, a gaming terminal with any plurality of reels may also be used in accordance with the present disclosure.

Figure 4:
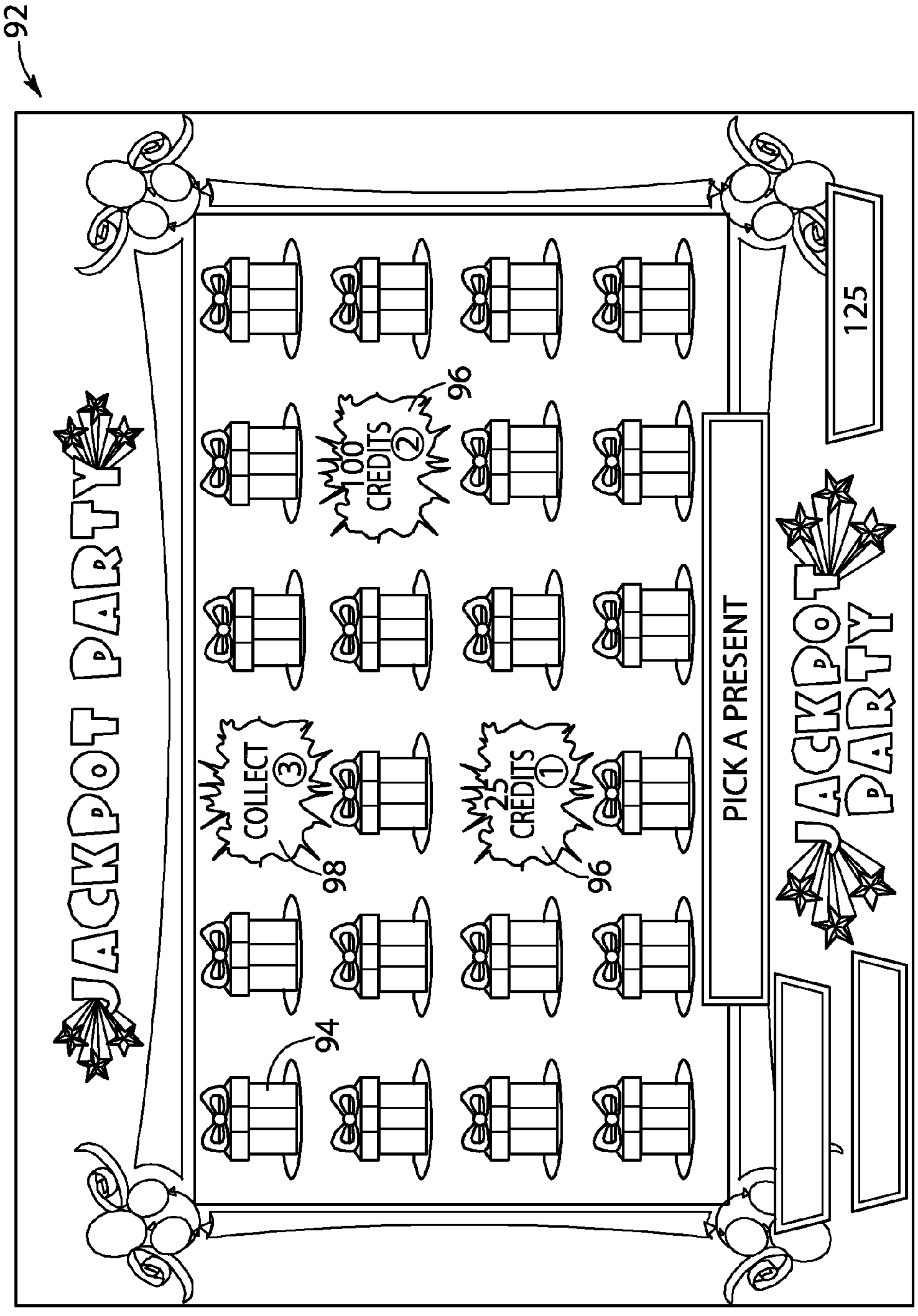
FIG. 4 is a screen shot of a bonus-game screen of an exemplary wagering game that can be played on the gaming machine of FIG. 1 and/or the gaming system of FIG. 2.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5A:
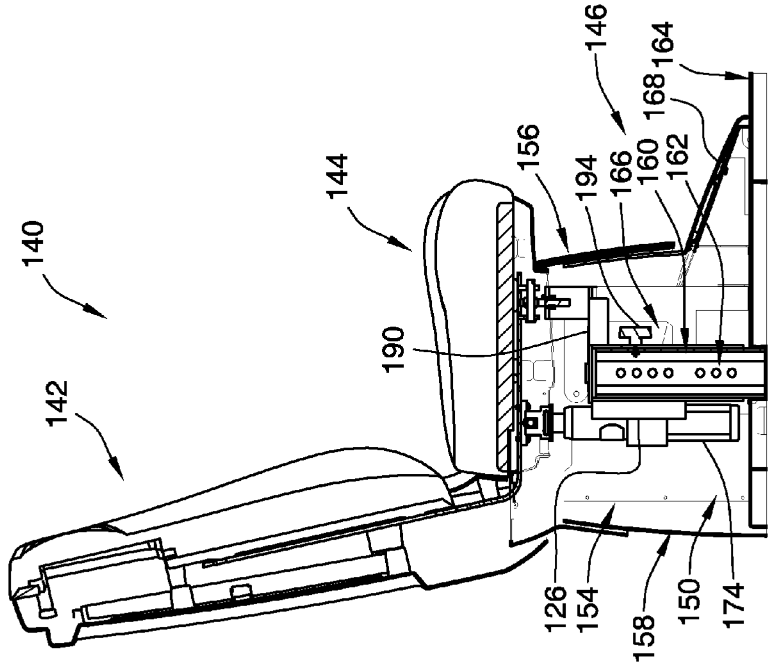
FIG. 5A is a side-view illustration of the exemplary gaming machine chair of FIG. 5 taken in partial cross-section along line 5A-5A.
Figure 5:
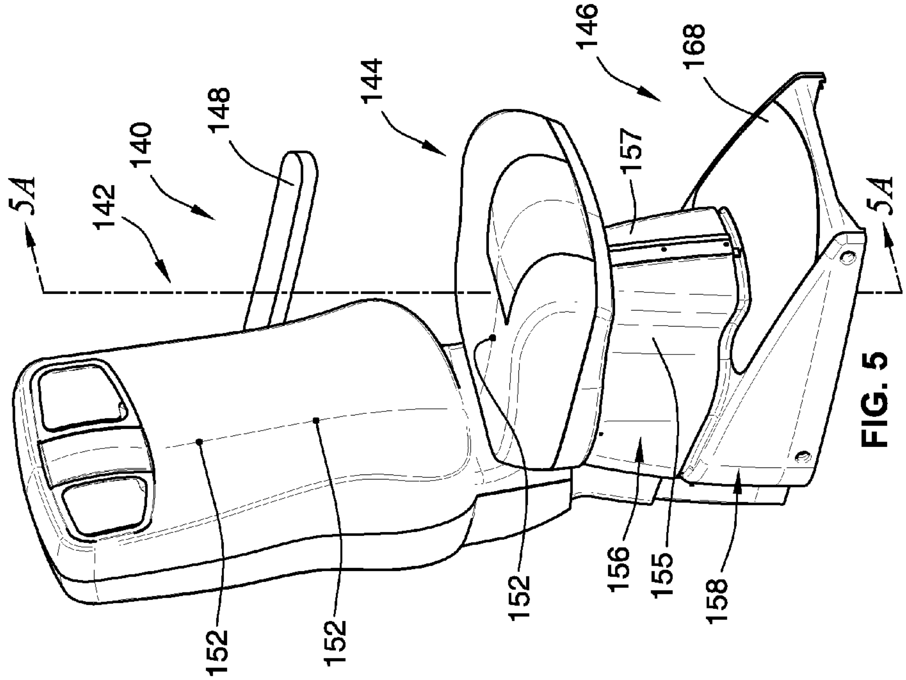
FIG. 5 is a front perspective-view illustration of an exemplary automated gaming chair in accordance with aspects of the present disclosure.

Referring now to FIG. 5, a perspective-view illustration of a representative gaming chair 140 (also referred to herein as "automated gaming chair" and "convertible gaming chair") for a wagering game system, wagering game terminal, and/or wagering game device is presented in accordance with aspects of the present disclosure. The gaming chair, which is indicated generally as 140 in FIG. 5, generally includes a backrest assembly (or "seatback" or "backrest portion") 142 and a seat assembly (or "seat bottom" or "seat portion") 144, both of which are functionally supported on a platform assembly 146. Both the backrest and seat assemblies 142, 144 can comprise components and features typical to a backrest and seat, respectively, such as cushions of various designs, materials, and durometer (e.g., Shore A or OO) ratings, as well as any requisite internally or externally located support structure. The platform assembly 146 is provided at a forward portion thereof with an optional angled footrest 168, which is subjacent the seat assembly 144. The seat and backrest portions 142, 144 may be swivel-mounted to the platform assembly 146 to ease entry to and alighting from the gaming chair 140. Moreover, the height and angle of the backrest portion 142, the seat portion 144, or both, may likewise be adjustable. It should be recognized that the disclosed concepts are not limited to the aesthetic aspects of the gaming chair 140 presented in the drawings, but rather can be applied to other chair designs. In addition, the disclosed concepts can be employed in combination with free-standing gaming terminals (upright and slant top), countertop gaming machines, handheld gaming devices, etc. In other non-limiting examples, the disclosed concepts can be employed in combination with solitary gaming environments, network gaming environments, community gaming environments, and bank gaming environments.

Communication between the gaming chair 140 and a gaming terminal, such as gaming terminal 10 of FIG. 1, or a gaming system, such as the exemplary gaming system of FIG. 2, may be accomplished in a variety of ways, including wireless transceivers, direct connectivity, or otherwise. Similar to the embodiment presented in FIG. 1, for example, the gaming chair 140 of FIGS. 5 and 5A includes a sled 164 with an internal wiring harnesses (not visible in the views provided), which together electrically and mechanically couple the gaming chair 140 to a gaming machine or a gaming system. The gaming chair 140 may also be operable to receive input from a player through various input devices, such as a button panel, touchscreen, microphone, joystick, mouse, or motion sensor(s) (none of which are shown), located at any of a number of locations, including a pivotable armrest 148 (only one of which is shown in FIG. 5, but an identical counterpart may be pivotably attached to the opposing side of the seatback portion 142). Other features may include, but are not limited to, a ticket printer, a card read/write device, a cup holder, foldout tray, a headphone jack, volume controls, brightness controls, cushion heaters, and a retractable tape for restricting use of the gaming chair 140 and/or corresponding gaming machine/system. Chair features and design options that may be incorporated into the gaming chair 140 (or any of the other embodiments disclosed herein) are disclosed in commonly-assigned U.S. Patent Application Publication No. 2008/0054561 A1, to Stephen A. Canterbury et al., filed in the U.S. on Sep. 21, 2007 and entitled "Gaming Machine Chair," which is also incorporated herein by reference in its entirety.

The gaming chair 140 can also be provided with a variety of sensing devices 152 that are operable, independently or through cooperative operation, to detect the position of the player relative to the gaming chair. There are numerous types of sensing devices that can be used, including, for example, acoustic sensing devices, such as ultrasonic sensors, thermal sensing devices, such as infrared sensors, optical sensing devices, such as light- and laser-based sensors, capacitive sensing devices, such as capacitive-based proximity sensors, pressure sensors, such as silicon piezoresistive pressure sensors, etc. These sensors can be packaged at numerous locations with respect to the gaming chair 140, for example, inside the backrest portion 142, seat portion 144, armrest 148, footrest 168, etc. The information generated by the sensors can be analyzed, for example, to determine how the player is positioned relative to the gaming chair. If automated, the motion of the gaming chair 140 can be selectively modified based on the occupant's position and/or movement relative to the gaming chair 140 as indicated by such sensors. In addition, the audio and visual presentation of the wagering game can be modified depending upon the detected position of the player. Additional options and features relating to gaming chair sensors is disclosed in commonly owned U.S. Provisional Application No. 61/409,164, which was filed on Nov. 2, 2010, and is incorporated herein by reference in its entirety.

The platform assembly, designated generally as 146 in the drawings, provides functional and operational support for the backrest and seat assemblies 142, 144. In this vein, the platform assembly 146 may be a normally stationary structure that is predominantly designed to provide player comfort as well as operative support to the reminder of the gaming chair 140, as will be developed further in the description of FIGS. 8, 9A and 9B. Conversely, the platform assembly 146 illustrated in FIGS. 5 and 5A is operable to automate movement of the gaming chair 140, for example, to provide motions related to events occurring during game play or events unrelated to game play. The platform assembly 146 is shown in FIG. 5A including a base assembly 150, a motion-enabling ("first") mounting assembly 154, a movable shroud 156, and a rigid boot 158. The motion-enabling mounting assembly 154 is interchangeable with, and thus can be replaced by, a non-motion ("second") mounting assembly 254 (one of which is exemplified in FIG. 8) for removably attaching the seat and backrest 142, 144 to the base assembly 142.

Figure 8:
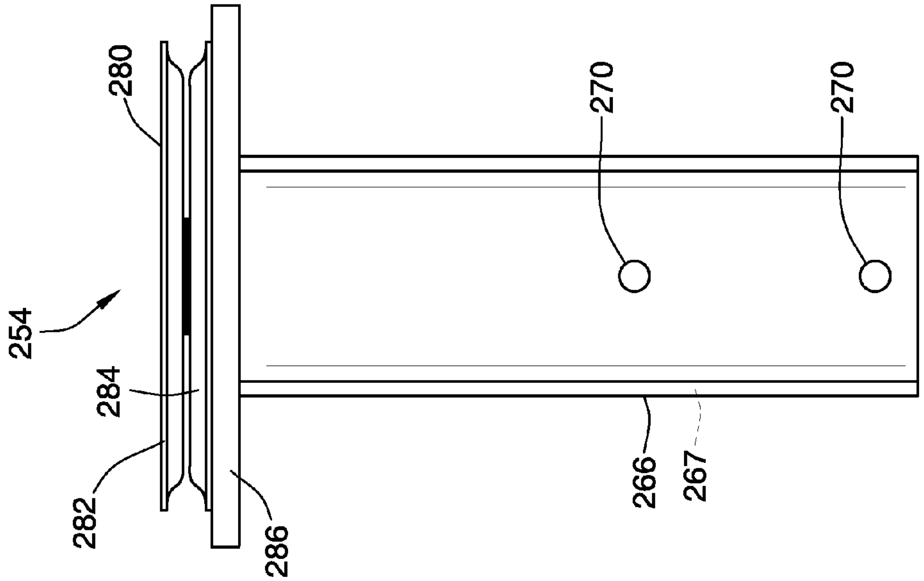
FIG. 8 is a perspective-view illustration of a representative non-motion mounting assembly in accordance with aspects of the present disclosure.
Figure 7:
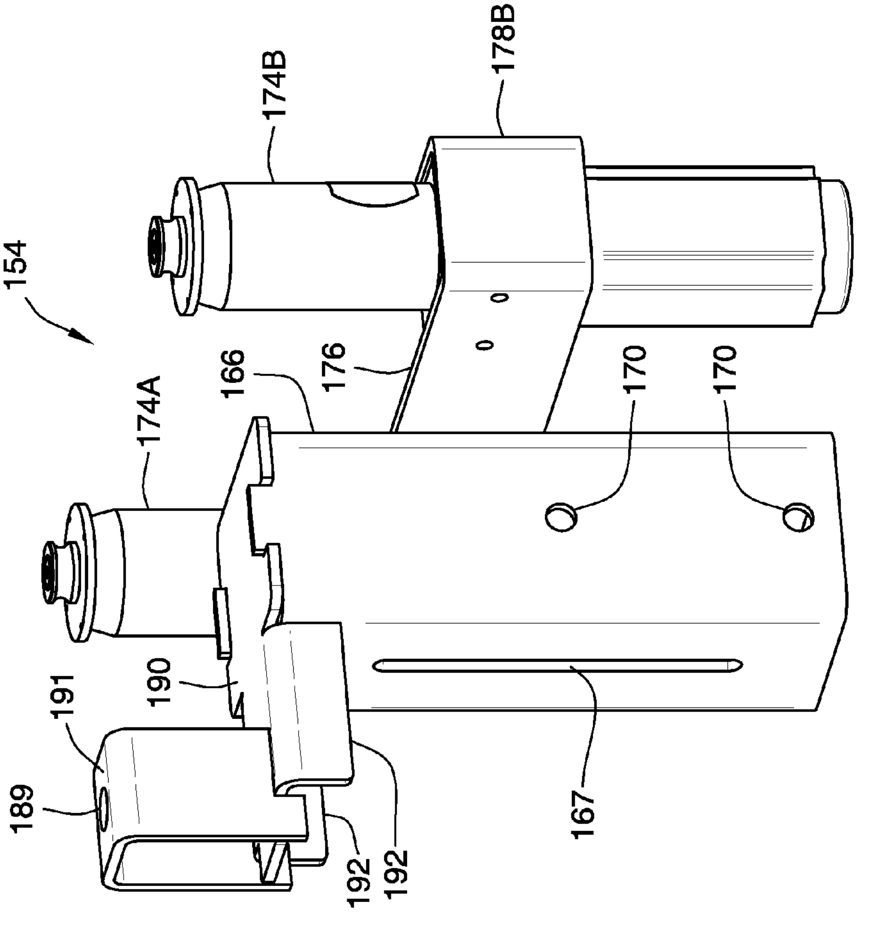
FIG. 7 is a perspective-view illustration of a representative motion-enabling mounting assembly in accordance with aspects of the present disclosure.

The base assembly 150 can generally be considered a two-part construction, with a rectangular sled 164 having a ("first") common mounting interface, designated generally as 160 in FIG. 5A, that is designed to interchangeably connect, one at a time, to a variety of mounting assemblies, such as the motion-enabling mounting assembly 154 of FIG. 7 and the non-motion ("second") mounting assembly 254 of FIG. 8. As mentioned above, the gaming chair 140 may be communicatively coupled to a corresponding gaming terminal or gaming system via a direct "hardline" connection, which may be accomplished with the sled 164, or via alternative means, such as a wireless connection. In the former instance, the gaming chair 140 can be fixed to and supported on the sled 164 by way of the mounting interface 160, and the sled 164 is anchored (e.g., via bolts) directly to or laid on the floor or commensurate support structure beneath the gaming chair 140. In the latter instance, the sled 164 can be eliminated from the construction of the gaming chair 140, wherein which the gaming chair 140, by way of the mounting interface 160, is permanently or releasably fixed directly to the floor/support structure.

The common mounting interface 160 of the base assembly 150 can take on a variety of configurations, including a support column 160 that projects orthogonally from the sled 164. The support column 160, as shown, is an elongated and rigid tubular structure with one or more longitudinally spaced holes, which are collectively indicated at 162. In combination, the support column 160 and longitudinally spaced holes 162 act as a "height adjustment mechanism" with a number of optional distinct heights for the gaming chair 140. In accordance with this example, the motion-enabling mounting assembly 154 includes an elongated, tubular mounting shaft 166 that is sized and shaped to telescopingly slide onto the support column 160. One or more apertures (designated 170 in FIGS. 6A-6C) are longitudinally spaced along the length of the mounting shaft 166. Likewise, as shown in FIG. 8, the non-motion mounting assembly 254 includes an elongated, tubular mounting shaft 266 that is sized and shaped to telescopingly slide onto the support column 160. One or more apertures 270 are longitudinally spaced along the length of the mounting shaft 766.

Figure 6:
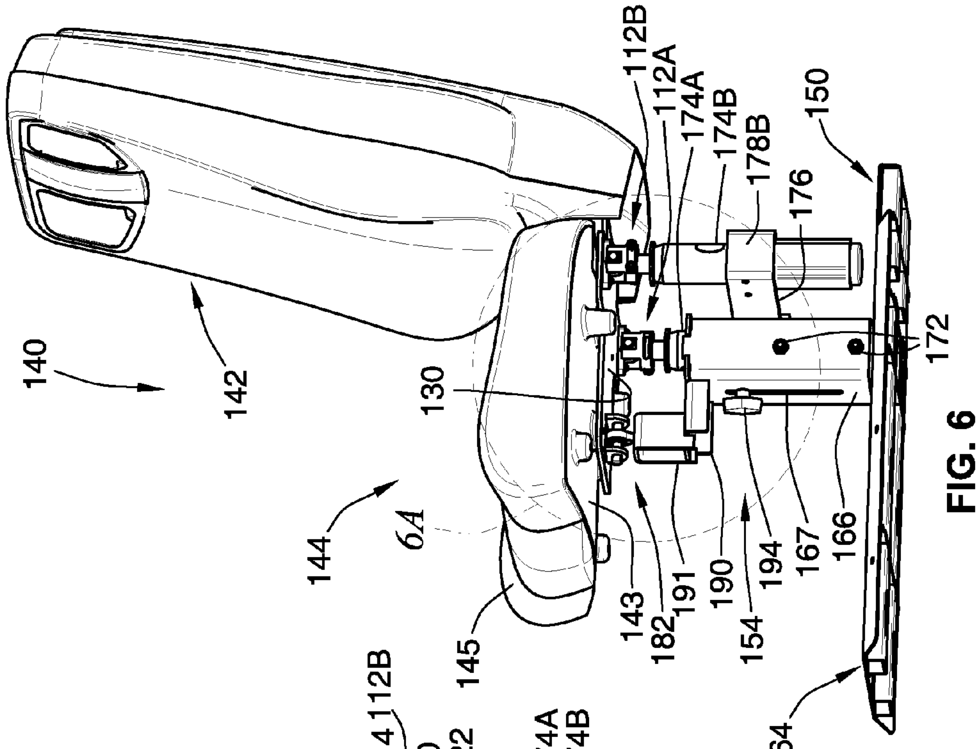
FIG. 6 is a side perspective-view illustration of the exemplary gaming chair of FIG. 5 shown with the boot and shroud removed.

At any one given time, either the motion-enabling mounting assembly 154 or the non-motion mounting assembly 254 can be concentrically aligned with and then slid onto the distal, upper end of the support column 160 such that the respective mounting shaft 166 or 266 overlaps and circumscribes the support column 160. In so doing, the mounting shaft 166 or 266 can be selectively repositioned—i.e., telescoped downwards or upwards, with respect to the support column 160 to align each of the respective apertures 170, 270 with a respective one of the holes 162. Once the apertures 170 or 270 are properly aligned with a respective hole 162, a complementary locking pin (172 in FIG. 6 or 272 in FIGS. 9A and 9B) can be received therein to lock the gaming chair 140 at a desired height. The gaming chair 140 can be subsequently removed from the base assembly 150, or its position changed to a different height, by removing the locking pins 172 or 272 and selectively repositioning the mounting shaft 166 or 266—i.e., telescoping downwards or upwards, with respect to the support column 160. For example, FIG. 6B is a perspective-view illustration of the gaming chair 140, which is shown locked in a first ("vertically lowest") position, whereas FIG. 6C shows the gaming chair 140 locked in a second ("vertically highest") position.

The shape, width and length of the support column 160, mounting shafts 166, 266, or any logical combination thereof, can be customized, for example, to accommodate different gaming chairs, different support surfaces, different gaming systems, and other intended applications. For instance, the support column 160 may be hollow, as shown, or may be fabricated as a solid bar to provide additional strength and rigidity for supporting a larger, heavier, and/or more unwieldy gaming chair. Likewise, the length of the support column 160 or mounting shafts 166, 266, or combinations thereof, can be varied, for example, to provide a higher or lower seating position. In addition, the number of holes 166 and/or apertures 170, 270 can be modified from the exemplary illustrated embodiments, for example, to provide greater or fewer distinct selectable chair heights. Although the support column 160 is shown as being received inside the mounting shafts 166, 266 when telescoping therewith, alternative configurations can have the mounting shafts 166, 266 nested inside the support column 160. In this instance, the mounting shafts 166, 266 may be fabricated as solid bars instead of the tubular structures shown in the drawings. Finally, the common mounting interface 160 of the base assembly 150 can take on alternative arrangements without departing from the scope of the present disclosure. In some non-limiting examples, the base assembly 150 and mounting assembly 154 can each comprise a respective one of the complementary, mating rails in a dovetail slide-rail assembly, a linear bearing slide-rail assembly, a T-shaped-rail slide-rail assembly, or any other similarly configured slide-rail assemblies.

The mounting assemblies 154, 254 can be provided with an optional tensioning mechanism to eliminate unwanted play or "rattling" between the support column 160 and the mounting shaft 166, 266. In a non-limiting example, a respective elongated channel 167 and 267 extends along the length of each mounting shaft 166, 266. A complementary tensioning knob 194, 294 can be received in and threadably mated with the elongated channel 167, 267. In this example, rotation of the tensioning knob 194, 294 in a first direction (e.g., clockwise in FIGS. 6A-6C) will press the mounting shaft 166, 266 against the support column 160. Contrastingly, rotation of the tensioning knob 194, 294 in an opposite second direction (e.g., counterclockwise in FIGS. 6A-6C) will reduce or eliminate this compressive force allowing for the mounting shaft 166, 266 to more readily translate with respect to the support column 160.

The motion-enabling mounting assembly 160 includes one or more actuators, which can be individually or cooperatively activated to move one or more selected portions of the gaming chair 140, such as the backrest assembly 142, the seat assembly 144, or both. According to the illustrated embodiment, two linear actuators 174—e.g., first and second brushless DC motors 174A and 174B, respectively, are packaged underneath the seat portion 144. A wing-shaped mounting bracket 176 is attached to and extends transversally across the elongated mounting shaft 166. At each opposing end of the mounting bracket 176 is a respective actuator sleeve 178A and 178B, within which is received a respective one of the actuators 174A, 174B. A pair of bolts (not shown) are fed through fastening holes 180 in each sleeve 178A, 178B to anchor the corresponding actuator 174A, 174B to the mounting bracket 176. In this arrangement, the actuable direction of movement of each actuator 174A, 174B is along a respective linear axis; these two axes are spaced from and generally parallel to one another and generally vertical (i.e., perpendicular) with respect to the ground or floor upon which the chair is supported. The mounting assembly 160, as shown, is designed such that neither of the actuators 174A, 174B directly contacts the base assembly 150 or the underlying floor. It is contemplated that the gaming chair 140 comprise greater or fewer than two actuators, such actuators taking on any of a variety of alternative constructs. For example, the actuators 174 may be in the form of pneumatic cylinders, hydraulic cylinders, electric actuators, electromechanical actuators, smart materials, linear actuators, etc. Moreover, the orientation and location of the individual actuators 174 can also be modified from what is shown in the drawings.

The moving portions of the actuators 174A, 174B are connected to the seat assembly 144 via respective link members, or "pillow-block connectors," which are designated generally as 112A and 112B. The link members 112A, 112B in this example are structurally identical; as such, for brevity and conciseness purposes, explanation of both link members 112A, 112B will be made with reference to the second link member 112B in FIG. 6A. The link member 112B comprises an eye connector 114 that is mounted via a hollow ball bearing 116 to a shaft 118, which is supported in a cradle 120. The eye connector 114 is screwed into a mounting plate 130 that is attached to the underside of the seat assembly 142. The cradle 120, on the other hand, is attached to the mobile portion of the actuator 174B via a U-shaped bar 122. The link member 112B, through the conjunctive joint-like engagement of the ball bearing 116 nesting inside the eye connector 114, can provide up to three rotational degrees of freedom (e.g., pitch, roll and yaw). In the illustrated embodiment, however, only two rotational degrees of freedom are available due to packaging restrictions.

A multi-directional connector 182, in cooperation with the actuators 174A, 174B and their corresponding link members 112A, 112B, functionally attaches the motion-enabling mounting assembly 154 to the seat assembly 144 via the mounting plate 130. The multi-directional connector 182, which can be best seen in FIG. 6A, has at least two rotational degrees of freedom, and in some embodiments three rotational degrees of freedom. For instance, the multi-directional connector 182, which is similar in function to a ball-joint rod end, includes a bearing grommet 184, which is similar in shape to a very small magnifying glass, with a central eyelet that is concentrically aligned with a support pin 186. The support pin 186 is buttressed at its opposing ends by a pair of tabs 188 that are rigidly attached to (e.g., welded) and project generally orthogonally from the underside of the mounting plate 130. Operatively nested and reinforced by the inner periphery of the bearing grommet 184 is a centrally located spherical bearing 185 that is free to slide axially along the support pin 186. A leg 187 projects radially from the outer periphery of the bearing grommet 184 and inserts into a complementary hole 189 (shown in FIG. 7) in the top of an inverted-U-shaped elevated platform 191. The leg 187 can be rigidly attached to the platform 191, for example, via welding, bolts, screws, rivets, etc. The elevated platform 191, in turn, is rigidly mounted on a bracket 190, which is fixed (e.g., welded) to the upper end of the mounting shaft 166. The bracket 190 includes a pair of juxtaposed flanges 192 that press against the outer periphery of the mounting shaft 166 to provide additional support for the platform 191 and multi-directional connector 182. Through this arrangement, the multi-directional connector 182 can provide at least two degrees of rotational freedom: rotation around the longitudinal center axis of the support pin 186 (e.g., around the z-axis in FIG. 6A), rotation around a generally horizontal laterally extending axis of the support pin 186 (e.g., around the x-axis in FIG. 6A), and combinations thereof. Alternative configurations can provide for an additional third degree of rotational freedom, namely rotation around a generally vertical transverse axis of the support pin 186 (e.g., around the x-axis in FIG. 6A).

From the foregoing description, it should be readily understood that the representative motion-enabling mounting assembly 154 is designed to removably and adjustably attach the backrest and seat assemblies 142, 144 to the base assembly 150. In the illustrated embodiment, the mounting shaft 166 is configured to releasably couple directly to the support column 160 of the base assembly 150, as explained above. In contrast, the mounting shaft 166 lacks direct mechanical contact with the seat assembly 144. Rather, the mounting shaft 166 of the mounting assembly 154 attaches to the seat assembly 144 through the two actuators 174A, 174B via link members 112A, 112B, and the platform 191 via multi-directional connector 182. In so doing, the motion-enabling mounting assembly 164, which is movably mounted to the height adjustment mechanism of the base assembly 150 (e.g., the combined support column 160 and holes 162), allows the mounting assembly 164, backrest assembly 142, seat assembly 144, and actuators 174A, 174B to reposition in unison between the available heights allotted for by the height adjustment mechanism, as seen in FIGS. 6B and 6C. The foregoing modular design is significantly advantageous over prior automated gaming chair designs, which either lack an adjustable-height feature altogether or require the entire gaming chair be disassembled to adjust the chair height.

Figure 6A:
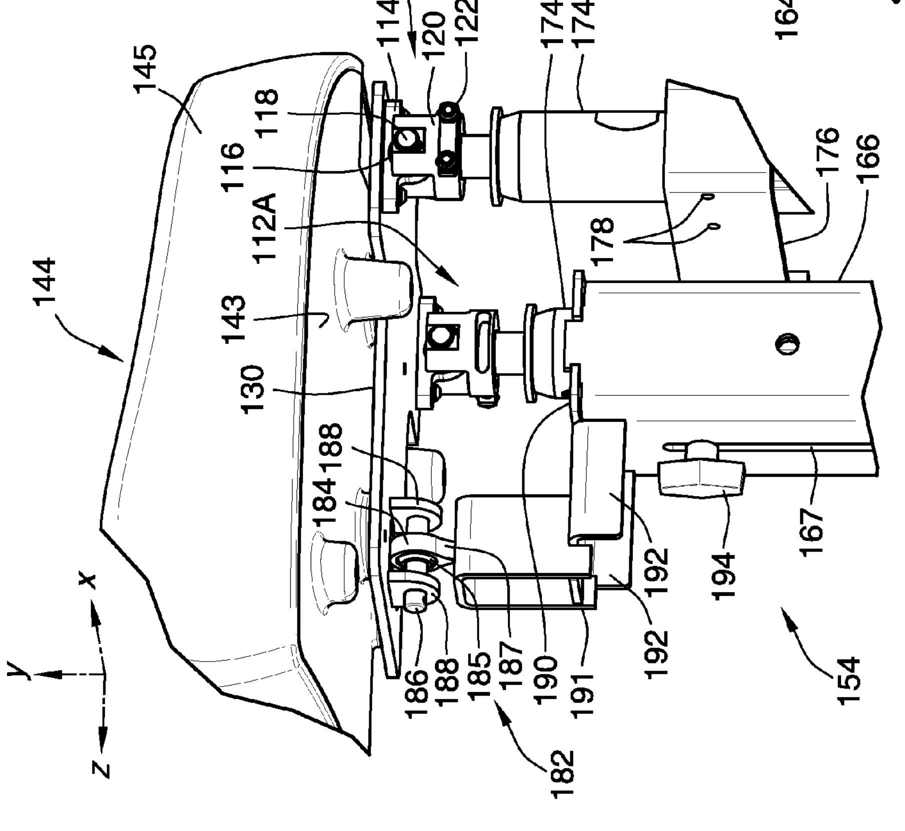
FIG. 6A is an enlarged perspective-view illustration of the mounting plate and portions of the motion-enabling mounting assembly of FIG. 6.

The actuators 174A, 174B and connector 182 are shown in FIGS. 6A-6C arranged in a triangular formation, with the multi-directional connector 182 at a central forward-location of the seat assembly 144 and each of the actuators 174A, 174B at a respective right or left rearward-location of the seat assembly 144. This triangular formation may correspond in geometry to an isosceles triangle, where the actuators 174A, 174B are both a first distance from the multi-directional connector 182 and a second distance from one another, the first and second distances being different. However, it should be understood that the relative orientation and location of the actuators 174A, 174B and connector 182 are not limited to what is shown in the illustrated embodiments. Depending, for example, on the number, location and orientation of the actuators 174, activation and modulation thereof can be controlled to provide any of a variety of chair movements. As noted above, the motion-enabling mounting assembly 154, as exemplified in the drawings, is configured to impart motion along at least two degrees of rotational freedom, e.g., pitch, roll, and combinations thereof. In alternative arrangements, the imparted chair motion can include, in any combination, heave (upward and downward rectilinear movement), surge (forward and rearward rectilinear movement), sway (lateral rectilinear movement), pitch (rotational movement about a lateral axis), roll (rotational movement about a longitudinal axis), and yaw (rotational movement about a vertical axis).

Figure 6D:
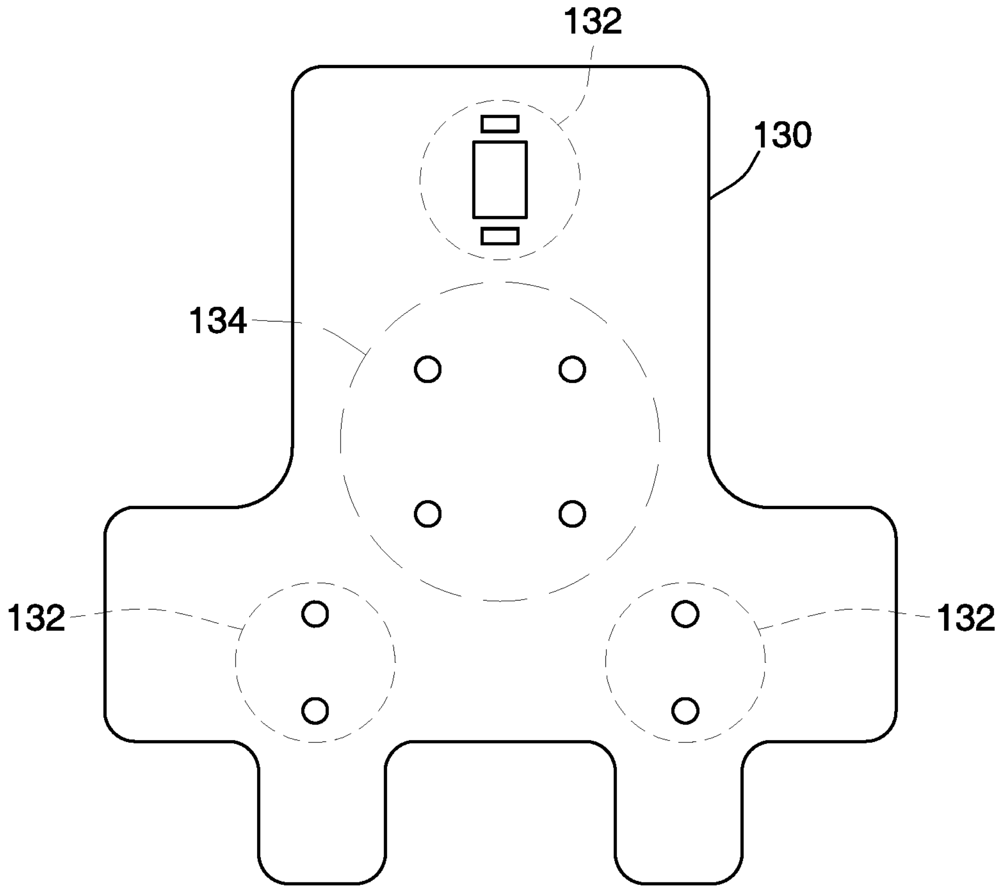
FIG. 6D is a plan-view illustration of the mounting plate from the exemplary gaming chair of FIG. 5.
Figure 9B:
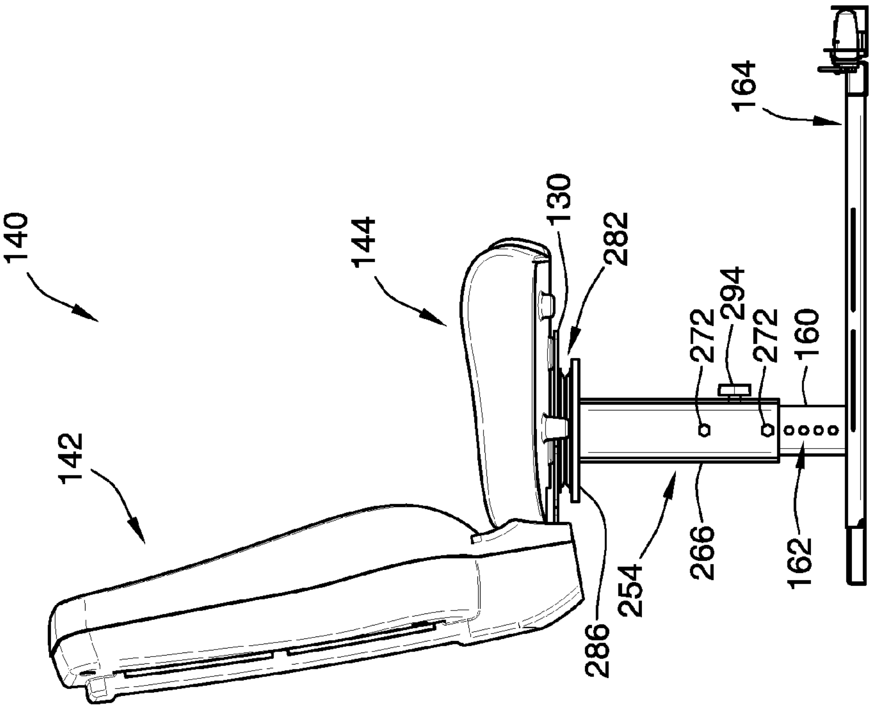
FIG. 9B is a side-view illustration of the exemplary gaming chair of FIG. 9A shown in a second ("vertically highest") position.
Figure 9A:
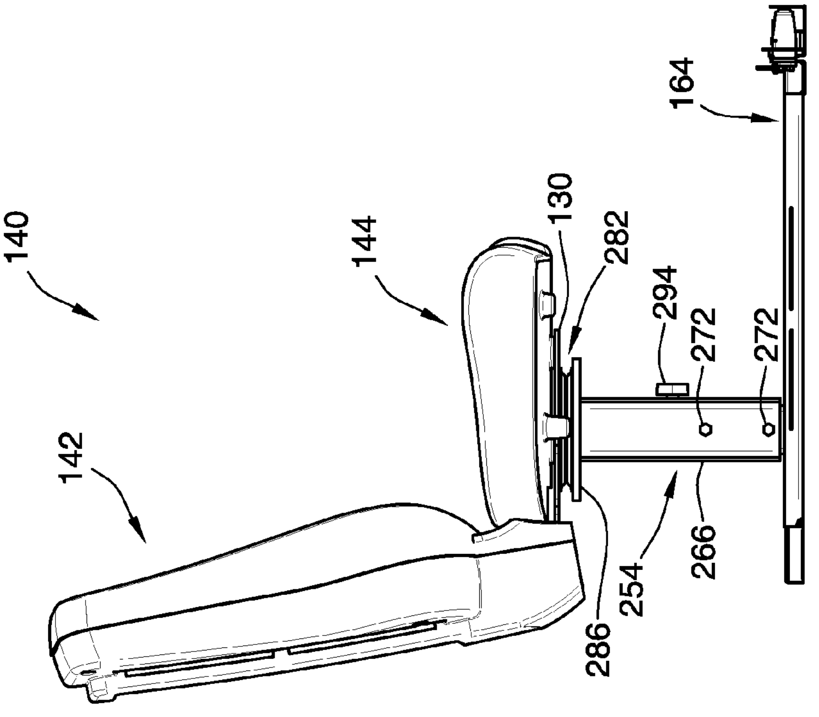
FIG. 9A is a side-view illustration of an exemplary gaming chair with the non-motion mounting assembly of FIG. 8, the exemplary gaming chair shown in a first ("vertically lowest") position.

As noted above, the motion-enabling mounting assembly 154 is interchangeable with, and thus can be replaced by, a structurally distinct, second mounting assembly, such as the non-motion mounting assembly 254 of FIG. 8, for removably attaching the seat and backrest assemblies 142, 144 to the base assembly 142, as seen in FIGS. 9A and 9B. The seat assembly 254 includes a ("second") common mounting interface 130 configured to interchangeably connect, one at a time, to the different mounting assemblies 154, 254. The common mounting interface 130 of the seat assembly 142 can take on a variety of configurations, including the mounting plate 130 of FIG. 6D. The mounting plate 130 is shown in FIG. 6A attached to the underside of a seat platform 143 upon which is supported a seat cushion 145. FIG. 6D is a plan-view illustration of the representative mounting plate 130, which is shown including two distinct fastener hole layouts 132 and 134, each layout being arranged to coincide with a corresponding layout of fastener holes in one of the mounting assemblies 154, 254. In particular, a first arrangement of fastener holes is identified in FIG. 6D with three dashed circles that are collectively designated 132. In the illustrated embodiment, the first arrangement of fastener holes 132 includes two pairs of threaded screw holes at the lower left-hand and right-hand sides of the mounting plate 130 in FIG. 6D, respectively, each of which will align with the fastener holes in the eye connectors 114 of one of the link members 112A, 112B. The first arrangement of fastener holes 132 also includes the pin holes in the tabs 188 through which is received the support pin 186 of the multi-directional connector 182. In contrast, a second arrangement of fastener holes, which is identified in FIG. 6D with the dashed circle designated 134, includes four threaded screw holes, each of which corresponds to one of four complementary fastener holes (not visible in the views provided) along the top of a swivel mechanism 280 (FIG. 8) attached to one end of the tubular mounting shaft 266 of the second mounting assembly 254.

Automation of the gaming chair 140 may be regulated by an assortment of different controllers. For example, the various components of the gaming chair 140 can be controlled by an onboard motion controller 126, as shown in FIG. 5A, either alone or in collaboration with an internally packaged emotive lighting and display controller (not visible in the views provided) or one or more external controllers and processors, such as the CPU 42 of the gaming terminal 10 and a remote controller included, for example, within the external system 46 of FIG. 2. In this vein, the gaming chair controllers can be manufactured with the appropriate hardware and software to respond to signals from a gaming machine (e.g., gaming terminal 10 of FIG. 1) and/or a gaming system (e.g., a bank, community, or network controller that is part of the external system 46 of FIG. 2) as directed by the gaming software, or to respond to input from the player, for controlling gaming functions provided by the gaming chair 140. In some embodiments, the motion controller and emotive lighting and display controller each includes a respective printed circuit board (PCB) with various components, such as a microprocessor. The controllers can be enclosed in a grounded material suitable to shield the controller from external interference such as electrostatic, radio frequency, and magnetic energy. Further to this embodiment, the controllers can include any of the options and features described above with respect to the CPU 42 of FIG. 2.

A movable shroud 156 circumscribes, conceals, and inhibits access to the underside area of the gaming chair 140. As indicated above, and illustrated in FIGS. 5 and 5A, the mounting assembly 154, including actuators 174A, 174B, and the base assembly 150 are positioned vertically subjacent to the seat assembly 144. The movable shroud 156 is fastened to the seat assembly 144 proximate to the outer periphery of the seat platform 143. The movable shroud 156 projects downwardly from the underside of the seat assembly 144, extending in a generally continuous manner around the upper-most region of the mounting assembly 154. In addition, a rigid, generally stationary boot 158 projects upwardly from the sled 164, extending in a generally continuous fashion around a substantial portion of the base assembly 150 and the lower-most region of the mounting assembly 154, as seen in FIG. 5A. The moveable shroud 156 and stationary boot 158 cooperate, as illustrated in FIGS. 5 and 5A and developed herein, to conceal and substantially inhibit access to the underside of the seat assembly 144, protecting players and other patrons from potentially hazardous components of the gaming chair 140 located under the seat assembly 144, and preventing unscrupulous parties from attempting to access the components under the gaming chair seat assembly 144. The relative orientation of the shroud 156 and boot 158 may be switched (i.e., the movable shroud 156 projecting upward from the sled 164 and the stationary boot 158 extending downward from the seat assembly 144) without departing from the intended scope of the presented disclosure.

The movable shroud 156, as embodied in the drawings, includes two separate pieces: a right lateral flank ("first flank") 155 and a left lateral flank ("second flank") 157. The two constituent flanks 155, 157 of the movable shroud 156 are operatively attached to each other (e.g., via rivets or heat stakes) and the seat assembly 144 for concurrent movement therewith. Although illustrated as two distinct, connected pieces, the movable shroud 156 may comprise any number of constituent parts fewer or greater than two. Moreover, each of the shroud pieces 155, 157 may be operatively attached to the mounting assembly 154 in addition to or as an alternative to the seat assembly 144. It is also envisioned that the movable shroud 156 be coupled directly to the base assembly 150 and/or boot 158 so long as movement of the seat assembly 144 is left unimpeded.

The moveable shroud 156 and stationary boot 158 cooperate, as briefly described above, to conceal and substantially inhibit access to the underside of the seat assembly 144. In one exemplary configuration, the movable shroud 156 is in continuous overlapping engagement with the stationary boot 158, thereby preventing intentional or inadvertent insertion of an appendage, extremity, clothing, or other object into the underside compartment of the gaming chair 140 where the base assembly 150, mounting assembly 154, and controllers 126 are located. By way of example, the lower portion of the inner surface of the movable shroud 156 (i.e., first and second flanks 155, 157) overlaps and presses against a corresponding upper portion of the outer surface of the stationary boot 158, as seen in FIG. 5A. In alternative arrangements, the lower portion of the outer surface of the movable shroud 156 may overlap and press against a corresponding upper portion of the inner surface of the stationary boot 158. This surface-to-surface engagement extends in a generally continuous manner around the entire upper periphery of the stationary boot 158.

The movable shroud 156 is in flexural engagement with the stationary boot 158 such that the movable shroud 156 bends or otherwise flexes during actuation of the actuators 174. By way of explanation, the movable shroud 156 may comprise a flexible material (e.g., an elastomeric thermoplastic polyurethane), whereas the boot 158 can be fabricated from a more rigid material (e.g. ABS). Accordingly, when one or more of the actuators 174 are activated, causing the gaming chair 140 to move (e.g., tilt), the movable shroud 156 will exhibit concomitant movement due to the mechanical coupling with the seat assembly 144 described above. As the movable shroud 156 shifts, the right lateral flank 172 or left lateral flank 174, or both, will press and flex against a corresponding portion of the boot 158. This flexural engagement minimizes (and perhaps eliminates) gaps between the shroud 156 and boot 158 during movement of the gaming chair 140, which in turn helps prevent the insertion of an appendage or extremity into the underside compartment of the gaming chair 140 subjacent the seat assembly 144. Another exemplary movable shroud configuration that can be incorporated into the gaming chair 140 of the subject disclosure is presented in commonly owned U.S. patent application Ser. No. 12/944,862 (Pre-grant Patent Publication No. US 2011/0111839 A1), to Paul M. Lesley et al., which was filed on Nov. 12, 2010, and is incorporated herein by reference in its entirety.

When comparing FIGS. 7 and 8, it can be seen that the second mounting assembly 254 is structurally distinct from, yet functionally interchangeable with the first mounting assembly 154 for adjustably mounting the backrest and seat assemblies 142, 144 to the base assembly 150. Like the first mounting assembly 154, the second mounting assembly 254 of FIG. 8 includes an elongated, tubular mounting shaft 266 that is sized and shaped to telescopingly slide onto and lock with the support column 160 of the base assembly 150, as explained above. By way of demonstration, FIGS. 9A and 9B provide side-view illustrations of the gaming chair 140 with the seat and backrest portions 142, 144 mounted to the base assembly 150 via the second mounting assembly 254. FIG. 9A shows the mounting assembly 254 locking the gaming chair 140 in a first ("vertically lowest") position, whereas FIG. 9B shows the mounting assembly 254 locking the gaming chair 140 in a second ("vertically highest") position. In some embodiments, the two mounting shafts 166 and 266 of FIGS. 7 and 8 are structurally identical.

The second mounting assembly 254 optionally comprises a swivel mechanism 280 attached to a support plate 286 on the upper "first" end of the mounting shaft 266. In some embodiments, the swivel mechanism 280 comprises a base 282 which sits on a platform 284 that contains ball bearings (not visible in the view provided), which allow the base 282 to rotate on the platform 284. The swivel mechanism 280 is configured, as described above with respect to FIG. 6D for example, to attach the mounting shaft 266 to the seat assembly 244, thus allowing the seat assembly 244 to rotate around the longitudinal axis of the mounting shaft 266 and, when operatively attached, the mounting interface 160 of the base assembly 150.

The second mounting assembly 254 can be considered a "non-motion mounting assembly" in that it lacks structure for selectively moving the backrest assembly 142 or seat assembly 144 in response to game-related signals from a controller. In this example, the mounting assembly 254 of FIG. 8 lacks actuators, such as the brushless DC motors 174A, 174B of FIG. 7, that are selectively actuable to move the seat portion 144 in response to signals from a gaming controller. Nevertheless, other portions of the gaming chair 140 may be equipped with motion-enabling features, such as haptic sensors or the requisite hardware to provide adjustable seat and backrest positioning. Rather, it is the mounting assembly 254 itself that lacks automating mechanisms.

Figure 10:
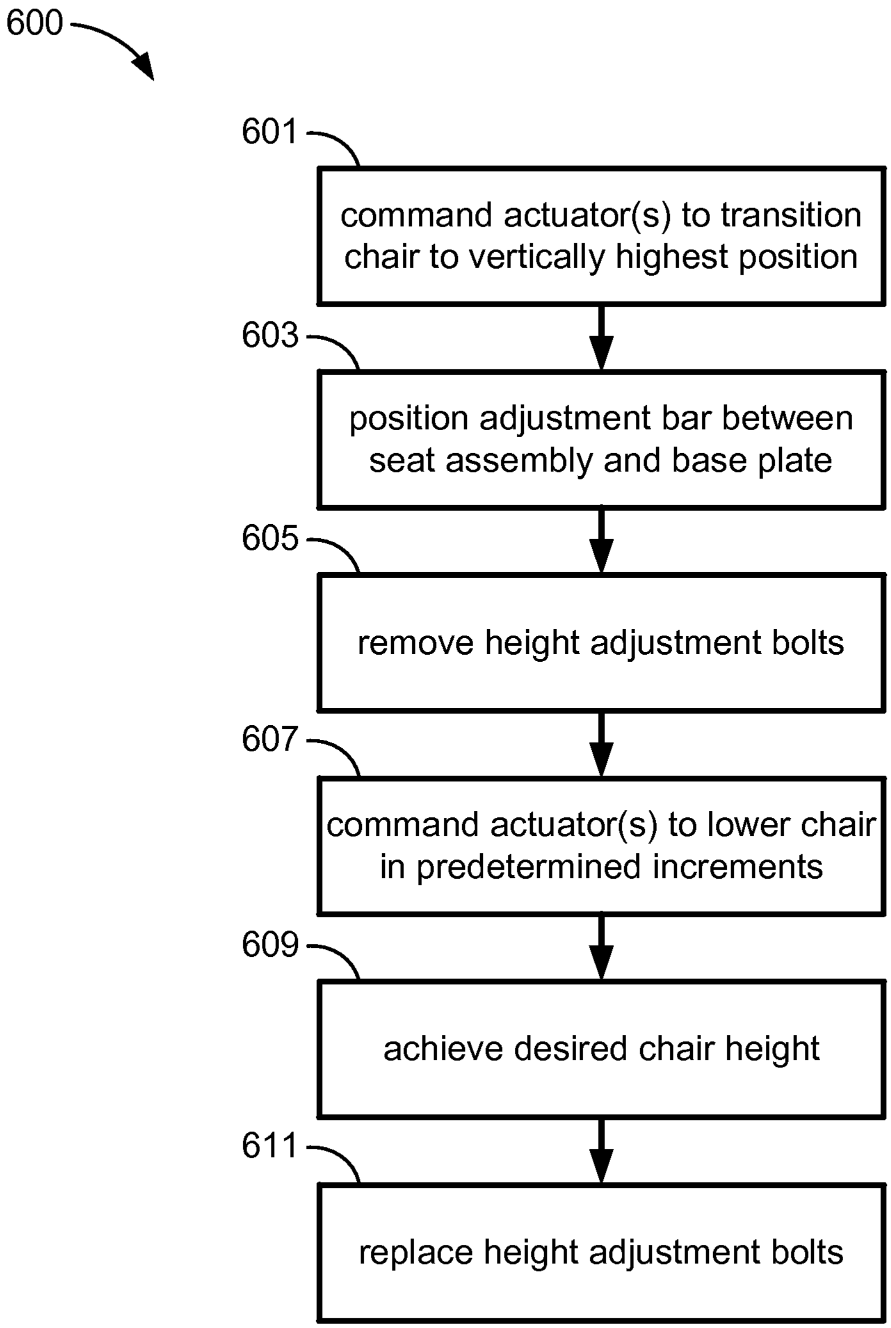
FIG. 10 is a flowchart representing an exemplary method for changing the height of a motion-enabled automated gaming chair.

With reference now to the flow chart of FIG. 10, an improved method 600 for adjusting the height of an automated gaming chair, such as the gaming chairs 40 and 140 presented hereinabove, is generally presented in accordance with certain embodiments. Although not so limited, description of the method 600 will be made with reference to the gaming chair 140 of FIG. 5. The method 600 includes, at block 601, commanding one or more of the actuators 174 of the gaming chair 140 to transition the gaming chair 140, or at least the seat portion 144, to its vertically highest position (e.g., FIG. 6C). In alternative embodiments, block 601 may comprise transitioning the gaming chair 140 to other heights that are not necessarily the highest position available, as exemplified in FIG. 6C. At block 603, a position adjustment bar is placed between the seat assembly 144 and the supporting base plate upon which the gaming chair 140 is supported. This may include wedging the height adjustment bar between the mounting plate 130 and the sled 164. The position adjustment bar may comprise an elongated bar of metallic material, such as steel, of a predetermined length. The method 600 includes, at block 605, removing the height adjustment bolts (e.g., locking pins 172) from the mounting assembly 154 and base assembly 150. The actuators 174 are then commanded to lower the seat portion 144 of the gaming chair 140 in predetermined increments and/or at a predetermined rate, as indicated at block 607, until a desired chair height is achieved, as indicated at block 609. The method 600 also includes replacing the height adjustment bolts (e.g., locking pins 172) to thereby lock the backrest and seat portions 142, 144 at the desired chair height.

Also presented herein are improved methods of converting a gaming chair from a system-automated gaming chair to a non-system-automated gaming chair. This method includes: disconnecting a first mounting assembly from the base, the first mounting assembly including at least one actuator configured to selectively move the seat portion in response to signals from a system controller; disconnecting the first mounting assembly from the seat portion; connecting a second mounting assembly, which is structurally distinct from and interchangeable with the first mounting assembly, to the seat portion, the second mounting assembly being configured to lock the seat portion at any one of a number of vertically stationary heights; and connecting the second mounting assembly to the base.

Also presented herein are improved methods of mounting a gaming chair for a wagering game system. This method comprises: connecting a motion-enabled mounting assembly to the seat portion of the gaming chair, the mounting assembly including a tubular mounting shaft attached to at least one actuator configured to selectively move the seat portion in response to signals from the controller; telescoping the mounting shaft onto the support column; translating the mounting shaft with respect to the support column to thereby unitarily reposition both the gaming chair and the mounting assembly to a desired height; and securing the mounting shaft to the support column to thereby lock both the gaming chair and the mounting assembly at the desired height.

In some embodiments, the methods presented hereinabove include at least those steps that are respectively enumerated. It is also within the scope and spirit of the present disclosure to omit steps, include additional steps, and/or modify the order presented above.

While many representative embodiments and modes for carrying out the present disclosure have been described in detail above, those familiar with the art to which this disclosure relates will recognize various alternative designs and embodiments for practicing the invention within the scope of the appended claims.

The invention claimed is:

1. A gaming system for playing a wagering game, the gaming system comprising:

a display device configured to display an outcome of the wagering game, the outcome being randomly determined from a plurality of wagering game outcomes;

a controller configured to output signals related to the wagering game;

a gaming chair including a seat assembly, a base configured to support the seat assembly, and a height adjustment mechanism between the base and the seat assembly; and a motion-enabling mounting assembly attached to the gaming chair and having a structural movable element and at least one actuator configured to selectively move the seat assembly in response to signals from the controller, the mounting assembly being movably mounted to the height adjustment mechanism such that the structural movable element, the seat assembly, and the at least one actuator move simultaneously vertically between a plurality of distinct heights.

2. The gaming system of claim 1, wherein the structural movable element is an elongated mounting shaft, and wherein the height adjustment mechanism includes an elongated support column configured to attach to the elongated mounting shaft.

3. The gaming system of claim 2, wherein at least one of the mounting shaft and the support column is tubular such that the mounting shaft is operable to telescope with the support column between the plurality of distinct heights.

4. The gaming system of claim 3, wherein the mounting shaft includes one or more longitudinally spaced apertures, and the support column includes one or more longitudinally spaced holes, and wherein the mounting shaft can be telescoped with the support column to align one of the apertures with a respective one of the holes such that a locking pin can be received therein to lock the gaming chair at one of the plurality of distinct heights.

5. The gaming system of claim 2, wherein the mounting assembly further comprises at least one mounting bracket attaching the at least one actuator to the mounting shaft, the mounting shaft being coupled directly to the base and being coupled to the seat assembly via the at least one actuator.

6. The gaming system of claim 1, wherein the at least one actuator consists of a first actuator spaced from a second actuator.

7. The gaming system of claim 6, wherein the structural movable element is an elongated mounting shaft with a bracket having at opposing ends thereof first and second sleeves, each of the first and second sleeves receiving therein a respective one of the first and second actuators.

8. The gaming system of claim 1, wherein the mounting assembly further comprises a multi-directional connector, the mounting assembly being connected to the seat assembly via the multi-directional connector and the at least one actuator.

9. The gaming system of claim 8, wherein the at least one actuator includes a first actuator spaced from a second actuator, the first and second actuators being selectively actuatable in cooperation with the multi-directional connector to impart motion to the gaming chair in at least two-degrees of rotational freedom.

10. The gaming system of claim 8, wherein the multi-directional connector includes a spherical bearing that is slidable along and pivotable about a support pin that is buttressed at opposing ends by a cradle.

11. The gaming system of claim 10, wherein the structural movable element is an elongated mounting shaft with a bracket at one end thereof, the spherical bearing, the support pin and the cradle cooperatively attaching the bracket to the seat assembly.

12. The gaming system of claim 1, further comprising a mounting plate attached to the seat portion, the mounting plate including a first arrangement of fastener holes configured to attach the seat assembly to the motion-enabling mounting assembly and a second arrangement of fastener holes configured to attach the seat assembly to a second mounting assembly structurally distinct from the motion-enabling mounting assembly.

13. The gaming system of claim 1, further comprising a movable shroud operatively attached to the gaming chair, the movable shroud inhibiting access to a region subjacent the seat assembly at which the motion-enabling mounting assembly is located.

14. The gaming system of claim 13, wherein the movable shroud is coupled directly to the seat assembly such that movement of the seat assembly directly moves the movable shroud.

15. The gaming system of claim 13, further comprising a stationary boot substantially circumscribing the base, the stationary boot at least partially overlapping the moveable shroud to substantially envelop the motion-enabling mounting assembly.

16. The gaming system of claim 13, wherein the movable shroud comprises a flexible material, the stationary boot being in flexural engagement with the movable shroud to bend the movable shroud during actuation of the at least one actuator.

17. A gaming system for playing a wagering game, the gaming system comprising:

an input device configured to receive a wager to play the wagering game;

a display configured to display an outcome of the wagering game, the outcome being determined from a plurality of wagering game outcomes;

a controller;

a gaming chair including:

a seat portion, a base, a height adjustment mechanism between the seat portion and the base, and a mounting assembly with a structural movable element, a multi-directional connector, and at least one actuator cooperatively coupling the mounting assembly to the seat portion, the at least one actuator being configured to selectively move the seat portion in response to signals from the controller, the mounting assembly movably mounting the seat portion to the height adjustment mechanism such that the structural movable element, the seat portion, and the at least one actuator move simultaneously vertically between a plurality of distinct heights.

18. A gaming chair for a wagering game system with a controller operable to output signals associated with a wagering game, the gaming chair comprising:

a backrest portion;

a seat portion;

a base configured to support the seat portion and the backrest portion, the base including a height adjustment mechanism; and a motion-enabling mounting assembly attached to the seat portion and having a structural movable element and at least one actuator configured to selectively move the seat portion in response to signals from the controller, the mounting assembly being movably mounted on the height adjustment mechanism of the base such that the structural movable element, the seat portion, the backrest portion, and the at least one actuator move simultaneously vertically between a plurality of distinct heights.

19. The gaming chair of claim 18, wherein the structural movable element is an elongated mounting shaft, and the height adjustment mechanism of the base includes an elongated support column, and wherein at least one of the mounting shaft and the support column is tubular such that the mounting shaft is operable to telescope with the support column between the plurality of distinct heights.

20. The gaming chair of claim 19, wherein the mounting shaft includes one or more longitudinally spaced apertures, and the support column includes one or more longitudinally spaced holes, and wherein the mounting shaft can be telescoped with the support column to align one of the apertures with a respective one of the holes such that a locking pin can be received therein to lock the gaming chair at one of the plurality of distinct height.

21. The gaming chair of claim 19, wherein the mounting assembly further comprises at least one mounting bracket attaching the at least one actuator to the mounting shaft, the mounting shaft being coupled directly to the base and being coupled to the seat assembly via the at least one actuator.

22. The gaming chair of claim 18, wherein the mounting assembly further comprises a multi-directional connector, the mounting assembly being attached to the seat assembly via the multi-directional connector and the at least one actuator.

23. The gaming chair of claim 22, wherein the at least one actuator includes a first actuator spaced from a second actuator, the first and second actuators being selectively actuatable in cooperation with the multi-directional connector to move the gaming chair in at least two-degrees of rotational freedom.

24. A motion-enabling mounting assembly for a gaming chair with a seat assembly and a base assembly, the base assembly including a support column projecting from a support surface, the motion-enabling mounting assembly comprising:

first and second actuators configured to attach to the seat assembly, the first and second actuators each being selectively actuatable to apply rectilinear forces to the seat assembly;

a multi-directional connector configured to attach to the seat assembly, the multi-directional connector having at least two-degrees of rotational freedom;

a tubular mounting shaft attached to the first and second actuators and the multi-directional connector, the tubular mounting shaft being configured to attach to the gaming chair via the first and second actuators and the multi-directional connector, the tubular mounting shaft being configured to telescope with and connect to the support column of the base to thereby lock the gaming chair at any one of a plurality of heights, the tubular mounting shaft, the seat assembly, and the first and second actuators being movable simultaneously vertically between the plurality of distinct heights.

25. A method of mounting a gaming chair for a wagering game system with a controller, the gaming chair having a seat portion and a base assembly, the base assembly having a support column projecting from a support surface, the method comprising:

connecting a motion-enabled mounting assembly to the seat portion of the gaming chair, the mounting assembly including a tubular mounting shaft attached to at least one actuator configured to selectively move the seat portion in response to signals from the controller;

telescoping the mounting shaft onto the support column;

translating the mounting shaft with respect to the support column to thereby simultaneously move vertically the seat portion, the at least one actuator, and the mounting shaft to a desired height; and securing the mounting shaft to the support column to thereby lock both the gaming chair and the mounting assembly at the desired height.

* * * * *